US012795368B2

(12) United States Patent
Marzban et al.

(10) Patent No.: US 12,795,368 B2
(45) Date of Patent: Nov. 10, 2026

(54) MANAGING UNTRUSTED USER EQUIPMENT (UES) FOR DATA COLLECTION

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 485 days.

(21) Appl. No.: 17/946,859

(22) Filed: Sep. 16, 2022

(65) Prior Publication Data

US 2024/0098496 A1 Mar. 21, 2024

(51) Int. Cl.
*H04W 12/12* (2021.01)
*H04L 41/16* (2022.01)

(52) U.S. Cl.
CPC ............. *H04W 12/12* (2013.01); *H04L 41/16* (2013.01)

(58) Field of Classification Search
CPC ................................ H04L 41/16; H04W 12/12
See application file for complete search history.

(56) References Cited

U.S. PATENT DOCUMENTS

2008/0178294 A1* 7/2008 Hu ........................ G06F 21/566 726/24
2017/0195554 A1* 7/2017 Shatz ................... H04B 10/541
2018/0367560 A1* 12/2018 Mahaffey ............ G06F 11/3409

(Continued)

FOREIGN PATENT DOCUMENTS

CN 113158183 A * 7/2021
WO WO-2022116421 A1 * 6/2022

OTHER PUBLICATIONS

Baracaldo N., et al., "Detecting Poisoning Attacks on Machine Learning in IoT Environments", 2018 IEEE International Congress on Internet of Things (ICIOT), Jul. 2-7, 2018, pp. 57-64.

(Continued)

*Primary Examiner* — Jeanette J Parker
*Assistant Examiner* — Dung L Lam
(74) *Attorney, Agent, or Firm* — HOLLAND & HART LLP

(57) ABSTRACT

Methods, systems, and devices for wireless communications are described. In some systems, a network entity may obtain information (e.g., a data set, a model update) corresponding to a user equipment (UE), the information associated with a machine learning model. The network entity may determine whether the information or the UE providing the information is trusted or untrusted based on the information. The network entity may output, to another network entity, an indication that the information corresponding to the UE is considered untrusted or trusted based on a predicted output of the machine learning model (e.g., if the model is trained using the information). The other network entity may further train the machine learning model using trusted information and may refrain from using untrusted information. Additionally, or alternatively, if a UE is determined to be untrusted, a network entity may configure the UE to refrain from further data collection processes.

28 Claims, 18 Drawing Sheets

(56) References Cited

U.S. PATENT DOCUMENTS

| | | | | |
|---|---|---|---|---|
| 2020/0349434 | A1* | 11/2020 | Zhang | G06N 3/042 |
| 2023/0396435 | A1* | 12/2023 | Baldwin | H04L 9/0897 |
| 2024/0098496 | A1* | 3/2024 | Marzban | H04L 41/16 |

OTHER PUBLICATIONS

Hong S., et al., "On the Effectiveness of Mitigating Data Poisoning Attacks with Gradient Shaping", CoRR, arXiv:2002.11497v2 [cs. CR], Feb. 27, 2020, pp. 1-18.

Nelson B., et al., "Exploiting Machine Learning to Subvert Your Spam Filter", LEET'08: In Proceedings of First USENIX Workshop on Large Scale Exploits and Emergent Threats, Apr. 2008, 9 Pages.

Steinhardt J., et al., "Certified Defenses for Data Poisoning Attacks", Advances in Neural Information Processing Systems (NeurIPS) 30 (2017), arXiv:1706.03691v2 [cs.LG], Nov. 24, 2017, pp. 1-15.

Zhao Y., et al., "PDGAN: A Novel Poisoning Defense Method in Federated Learning Using Generative Adversarial Network", International Conference on Algorithms and Architectures for Parallel Processing, ICA3PP 2019, Jan. 22, 2020, pp. 595-609.

* cited by examiner

MANAGING UNTRUSTED USER EQUIPMENT (UES) FOR DATA COLLECTION

INTRODUCTION

The following relates to wireless communications, including managing data collection for machine learning.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communications at a first network entity is described. The method may include obtaining information corresponding to a UE, the information associated with a machine learning model, the machine learning model trained in accordance with a data collection process for a set of multiple UEs associated with the machine learning model. In some examples, the method may include outputting an indication that the information corresponding to the UE is considered one of untrusted or trusted in accordance with a predicted output of the machine learning model, the predicted output of the machine learning model based on the information corresponding to the UE.

An apparatus for wireless communications at a first network entity is described. The apparatus may include a processor and memory coupled with the processor. The processor may be configured to obtain information corresponding to a UE, the information associated with a machine learning model, the machine learning model trained in accordance with a data collection process for a set of multiple UEs associated with the machine learning model. In some examples, the processor may be further configured to output an indication that the information corresponding to the UE is considered one of untrusted or trusted in accordance with a predicted output of the machine learning model, the predicted output of the machine learning model based on the information corresponding to the UE.

Another apparatus for wireless communications at a first network entity is described. The apparatus may include means for obtaining information corresponding to a UE, the information associated with a machine learning model, the machine learning model trained in accordance with a data collection process for a set of multiple UEs associated with the machine learning model. In some examples, the apparatus may further include means for outputting an indication that the information corresponding to the UE is considered one of untrusted or trusted in accordance with a predicted output of the machine learning model, the predicted output of the machine learning model based on the information corresponding to the UE.

A non-transitory computer-readable medium storing code for wireless communications at a first network entity is described. The code may include instructions executable by a processor to obtain information corresponding to a UE, the information associated with a machine learning model, the machine learning model trained in accordance with a data collection process for a set of multiple UEs associated with the machine learning model. In some examples, the code may further include instructions executable by the processor to output an indication that the information corresponding to the UE is considered one of untrusted or trusted in accordance with a predicted output of the machine learning model, the predicted output of the machine learning model based on the information corresponding to the UE.

Some examples of the method, apparatuses, and non-transitory computer-readable medium described herein may further include operations, features, means, or instructions for performing outlier detection on the information corresponding to the UE, where the information corresponding to the UE may be considered one of untrusted or trusted based on the outlier detection.

Some examples of the method, apparatuses, and non-transitory computer-readable medium described herein may further include operations, features, means, or instructions for determining a change in performance of the machine learning model based on the information corresponding to the UE, where the predicted output of the machine learning model satisfies a threshold for data corruption based on the change in performance.

Some examples of the method, apparatuses, and non-transitory computer-readable medium described herein may further include operations, features, means, or instructions for assigning a trust score to the information corresponding to the UE in accordance with the predicted output of the machine learning model, where the indication that the information corresponding to the UE may be considered one of untrusted or trusted includes the trust score. In some examples of the method, apparatuses, and non-transitory computer-readable medium described herein, the trust score includes a percentage value, or a quantized value, or both. In some examples of the method, apparatuses, and non-transitory computer-readable medium described herein, the trust score may be associated with a time period for data collection from the UE.

Some examples of the method, apparatuses, and non-transitory computer-readable medium described herein may further include operations, features, means, or instructions for obtaining additional information corresponding to the UE, the additional information associated with the machine learning model, and classifying the additional information corresponding to the UE as untrusted based on the information corresponding to the UE being considered untrusted.

In some examples of the method, apparatuses, and non-transitory computer-readable medium described herein, outputting the indication that the information corresponding to the UE may be considered one of untrusted or trusted may include operations, features, means, or instructions for outputting, for a database configured to store UE information for the data collection process, the indication that the information corresponding to the UE may be considered one of untrusted or trusted.

Some examples of the method, apparatuses, and non-transitory computer-readable medium described herein may further include operations, features, means, or instructions for storing a list of trusted UEs, or a list of untrusted UEs, or both based on the information corresponding to the UE being considered one of untrusted or trusted.

Some examples of the method, apparatuses, and non-transitory computer-readable medium described herein may further include operations, features, means, or instructions for predicting whether the UE intentionally corrupted the information corresponding to the UE and handling the information corresponding to the UE based on the prediction.

Some examples of the method, apparatuses, and non-transitory computer-readable medium described herein may further include operations, features, means, or instructions for obtaining a request for the information corresponding to the UE, where the indication that the information corresponding to the UE may be considered one of untrusted or trusted may be output in response to the request.

Some examples of the method, apparatuses, and non-transitory computer-readable medium described herein may further include operations, features, means, or instructions for outputting a configuration for the UE to refrain from the data collection process associated with the machine learning model based on the information corresponding to the UE being considered untrusted.

Some examples of the method, apparatuses, and non-transitory computer-readable medium described herein may further include operations, features, means, or instructions for terminating a connection that corresponds to the UE based on the information corresponding to the UE being considered untrusted.

Some examples of the method, apparatuses, and non-transitory computer-readable medium described herein may further include operations, features, means, or instructions for restricting wireless service for the UE based on the information corresponding to the UE being considered untrusted.

Some examples of the method, apparatuses, and non-transitory computer-readable medium described herein may further include operations, features, means, or instructions for outputting a parameter associated with the machine learning model to one or more UEs, where the UE may be excluded from the one or more UEs based on the information corresponding to the UE being considered untrusted.

In some examples of the method, apparatuses, and non-transitory computer-readable medium described herein, the information corresponding to the UE includes training data for the machine learning model, or one or more measurement values for the UE, or an update to the machine learning model, or a combination thereof.

A method for wireless communications is described. The method may include obtaining a set of multiple data sets corresponding to a set of multiple UEs and training a machine learning model with a first data set of the set of multiple data sets based on the first data set corresponding to a first UE of the set of multiple UEs that is considered trusted. In some examples, the method may further include outputting an output parameter of the machine learning model based on the trained machine learning model.

An apparatus for wireless communications is described. The apparatus may include a processor and memory coupled with the processor. The processor may be configured to obtain a set of multiple data sets corresponding to a set of multiple UEs and train a machine learning model with a first data set of the set of multiple data sets based on the first data set corresponding to a first UE of the set of multiple UEs that is considered trusted. In some examples, the processor may be configured to output an output parameter of the machine learning model based on the trained machine learning model.

Another apparatus for wireless communications is described. The apparatus may include means for obtaining a set of multiple data sets corresponding to a set of multiple UEs and means for training a machine learning model with a first data set of the set of multiple data sets based on the first data set corresponding to a first UE of the set of multiple UEs that is considered trusted. In some examples, the apparatus may further include means for outputting an output parameter of the machine learning model based on the trained machine learning model.

A non-transitory computer-readable medium storing code for wireless communications is described. The code may include instructions executable by a processor to obtain a set of multiple data sets corresponding to a set of multiple UEs and train a machine learning model with a first data set of the set of multiple data sets based on the first data set corresponding to a first UE of the set of multiple UEs that is considered trusted. In some examples, the code may further include instructions executable by the processor to output an output parameter of the machine learning model based on the trained machine learning model.

Some examples of the method, apparatuses, and non-transitory computer-readable medium described herein may further include operations, features, means, or instructions for refraining from training the machine learning model using a second data set of the set of multiple data sets based on the second data set corresponding to a second UE of the set of multiple UEs that may be considered untrusted.

In some examples of the method, apparatuses, and non-transitory computer-readable medium described herein, obtaining the set of multiple data sets may include operations, features, means, or instructions for obtaining a set of multiple indications that indicate whether the set of multiple data sets, or the set of multiple UEs, or both may be considered one of untrusted or trusted, where the machine learning model may be trained based on the set of multiple indications.

In some examples of the method, apparatuses, and non-transitory computer-readable medium described herein, obtaining the set of multiple data sets may include operations, features, means, or instructions for obtaining a set of multiple trust scores that correspond to the set of multiple data sets, or the set of multiple UEs, or both and comparing the set of multiple trust scores to a threshold for data corruption, where the machine learning model may be trained based on the comparison.

Some examples of the method, apparatuses, and non-transitory computer-readable medium described herein may further include operations, features, means, or instructions for outputting a request for the set of multiple data sets, where the set of multiple data sets may be obtained in response to the request.

In some examples of the method, apparatuses, and non-transitory computer-readable medium described herein, the set of multiple data sets may be obtained from a network entity, or a database, or both.

A method for wireless communications at a UE is described. The method may include transmitting, based on a data collection process for a set of multiple UEs associated with a machine learning model, information corresponding to the UE, the information associated with the machine learning model. In some examples, the method may further include receiving, based on a consideration of the UE as untrusted in accordance with a predicted output of the machine learning model, a control signal that configures the UE to refrain from the data collection process. In some examples, the predicted output of the machine learning model may be based on the information corresponding to the UE.

An apparatus for wireless communications at a UE is described. The apparatus may include a processor and memory coupled with the processor. The processor may be configured to transmit, based on a data collection process for a set of multiple UEs associated with a machine learning model, information corresponding to the UE, the information associated with the machine learning model. In some examples, the processor may be further configured to receive, based on a consideration of the UE as untrusted in accordance with a predicted output of the machine learning model, a control signal that configures the UE to refrain from the data collection process. In some examples, the predicted output of the machine learning model may be based on the information corresponding to the UE.

Another apparatus for wireless communications at a UE is described. The apparatus may include means for transmitting, based on a data collection process for a set of multiple UEs associated with a machine learning model, information corresponding to the UE, the information associated with the machine learning model. In some examples, the apparatus may further include means for receiving, based on a consideration of the UE as untrusted in accordance with a predicted output of the machine learning model, a control signal that configures the UE to refrain from the data collection process. In some examples, the predicted output of the machine learning model may be based on the information corresponding to the UE.

A non-transitory computer-readable medium storing code for wireless communications at a UE is described. The code may include instructions executable by a processor to transmit, based on a data collection process for a set of multiple UEs associated with a machine learning model, information corresponding to the UE, the information associated with the machine learning model. In some examples, the instructions may be further executable by the processor to receive, based on a consideration of the UE as untrusted in accordance with a predicted output of the machine learning model, a control signal that configures the UE to refrain from the data collection process. In some examples, the predicted output of the machine learning model may be based on the information corresponding to the UE.

Some examples of the method, apparatuses, and non-transitory computer-readable medium described herein may further include operations, features, means, or instructions for performing a channel measurement, where the information corresponding to the UE includes one or more measurement values based on the channel measurement.

Some examples of the method, apparatuses, and non-transitory computer-readable medium described herein may further include operations, features, means, or instructions for determining an update to the machine learning model, where the information corresponding to the UE includes the update to the machine learning model.

Some examples of the method, apparatuses, and non-transitory computer-readable medium described herein may further include operations, features, means, or instructions for refraining from transmission of additional information corresponding to the UE based on the control signal, the additional information associated with the machine learning model.

In some examples of the method, apparatuses, and non-transitory computer-readable medium described herein, a connection between the UE and a network entity may be terminated based on the consideration of the UE as untrusted.

DETAILED DESCRIPTION

Figure 1:
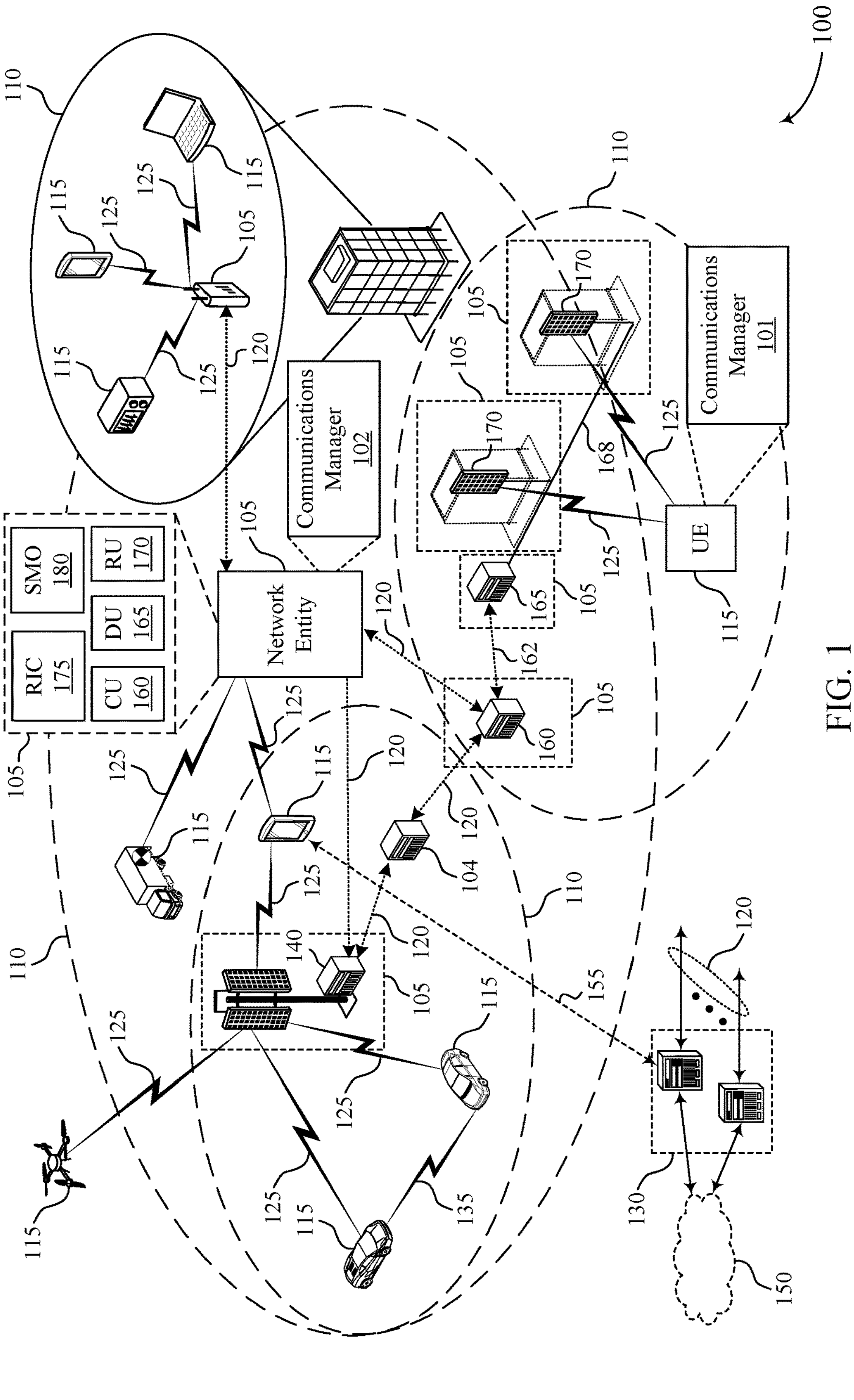
FIG. 1 illustrates an example of a wireless communications system that supports managing untrusted UEs for data collection in accordance with one or more aspects of the present disclosure.

In some wireless communications systems, devices may support machine learning operations. For example, a network entity may train a machine learning model to support network power saving operations, user equipment (UE) power saving operations, load management, beam management, channel estimation, or any other functionality that may be improved using machine learning techniques. As described herein, a machine learning model may be a data-driven algorithm that generates one or more outputs indicating predicted information based on one or more inputs. The network entity may collect information (e.g., data, model updates) from one or more UEs to train the machine learning model, test the machine learning model, validate the machine learning model, or any combination thereof. However, in some cases, a UE may provide corrupted or otherwise perturbed information for machine learning operations (e.g., model training, testing, validating). As described herein, unreliable, corrupted, or perturbed information may be a data set, a measurement, a model update, or any combination thereof that is corrupted, perturbed, in error, modified, or that may degrade the performance of a machine learning model. If the network entity can identify such information or a UE sending such information, the network entity may improve the reliability, performance, and security of the machine learning operations by refraining from using such information.

As described herein, one or more network entities may determine and share trust information for one or more UEs to support using trusted UEs and trusted data for machine learning operations. As described herein, a trusted UE may be any UE that provides reliable information to a network entity for machine learning operations. Reliable information may be a data set, a measurement, a model update, or any combination thereof that is uncorrupted, unperturbed, and that may improve the performance of a machine learning model. As described herein, an untrusted UE may be any UE that provides unreliable information (e.g., corrupted information, perturbed information) to a network entity for machine learning operations. In some examples, a device (e.g., a network entity) may determine that information is unreliable based on performing outlier detection on the information. For example, outlier detection may involve comparing the information (e.g., a set of data) to previously used training data or data that has been verified as accurate. If the information, or a portion of the information, fails to satisfy a threshold for outlier detection (e.g., the information includes data that is outside an expected range of values for the previously used training data or verified data), the device may determine (e.g., detect) that the information, or the portion of the information, includes outlier data that may potentially skew machine learning model training.

A network entity may perform a data collection process and may obtain information corresponding to a UE, the information associated with a machine learning model. The data collection process may be an example of a process for obtaining data (e.g., measurements, metrics) from multiple devices to use for improving (e.g., training, testing, validating) a machine learning model. The information obtained from the UE may be a data set (e.g., including measurements) determined by the UE and supporting training of the machine learning model, or the information may be an update to the machine learning model derived by the UE. The network entity may determine whether the information or the UE providing the information is trusted or untrusted based on a predicted output of the machine learning model. As described herein, a predicted output of a machine learning model may be a prediction of any output or parameter associated with the machine learning model if the machine learning model is trained using the information. Such a predicted output may be an output value from the model in response to a set of inputs or a performance metric indicating a reliability of the model. The network entity may train a version of the model using the information to determine the predicted output for the model, or the network entity may analyze the information and the machine learning model to predict the output without using the information for model training. For example, the predicted output of the machine learning model may be a predicted performance change for the machine learning model if the information is used to train the machine learning model. In some examples, the network entity may assign a trust label to the information or the UE, where the trust label is a binary value indicating whether the information or the UE is trusted or untrusted. In some other examples, the network entity may assign a trust score to the information or the UE, where the trust score is a percentage value or a quantized value indicating a level of trust based on a scale. The network entity may output, to another network entity (e.g., a model training entity), an indication that the information corresponding to the UE is considered untrusted or trusted based on the trust information (e.g., trust label, trust score) for the information or the UE.

The other network entity (e.g., a model training entity) may obtain multiple data sets corresponding to multiple UEs. Additionally, the network entity may obtain indications of whether the data sets, the UEs, or both are trusted or untrusted. The network entity may train a machine learning model using a first data set based on the first data set being considered trusted or the UE corresponding to first data set being considered trusted. However, the network entity may refrain from using a second data set for the machine learning model training based on the second data set being considered untrusted or the UE corresponding to second data set being considered untrusted. The network entity may output a parameter of the machine learning model based on training the machine learning model using the trusted information. For example, the parameter may be an example of a model parameter (e.g., a quantity of layers, a quantity of nodes, a weight, a bias) at least partially defining the machine learning model. The network entity may output the model parameter to another device such that the other device may deploy the machine learning model in accordance with the model parameter. In some other examples, the parameter may be an example of an output parameter (e.g., a value or prediction output by the machine learning model), and the network entity may output the output parameter based on deploying and executing the trained machine learning model at the network entity.

In some examples, if a UE is considered untrusted, a network entity may apply a penalty to the UE. As described herein, a penalty may be an action taken by the network entity or functionality configured by the network entity for the UE in order to mitigate the effects of an untrusted UE. For example, the network entity may transmit a control signal (e.g., a radio resource control (RRC) signal, a medium access control (MAC) control element (CE), a downlink control information (DCI) signal) that configures the penalty for the untrusted UE. In some examples, the control signal may configure the UE to refrain from a data collection process based on the UE being considered untrusted. In some other examples, the network entity may terminate a connection with the UE or restrict a service for the UE based on the UE being considered untrusted. Additionally, or alternatively, the network entity may refrain from sending model parameters or other information related to a machine learning model to the UE based on the UE being considered untrusted.

Aspects of the subject matter described herein may be implemented to support improved machine learning operations at a network entity. For example, the network entity may detect and share trust information corresponding to data sets, UEs, or both. Such trust information may allow one or more network entities in a wireless communications system to refrain from using untrusted data sets or other information from untrusted UEs in machine learning operations, effectively improving the reliability, accuracy, and performance of the machine learning operations. Additionally, the network entities may coordinate the trust information between the network entities to support tracking untrusted UEs throughout the system, improving machine learning operations at other network entities in the system. Additionally, or alternatively, a network entity may improve a processing overhead and a signaling overhead associated with a data collection process based on configuring untrusted UEs to refrain from participating in the data collection process. The network entity may further improve system security by terminating a connection, restricting a service, or both for one or more untrusted UEs, effectively removing untrusted UEs from the system and stopping the untrusted UEs from potentially attempting to harm or otherwise degrade the performance of the system.

Aspects of the disclosure are initially described in the context of wireless communications systems. Additional aspects of the disclosure are described with reference to a network architecture, machine learning processes, and a process flow. Aspects of the disclosure are further illustrated by and described with reference to apparatus diagrams, system diagrams, and flowcharts that relate to managing untrusted UEs for data collection.

FIG. 1 illustrates an example of a wireless communications system 100 that supports managing untrusted UEs for data collection in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a network entity also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, an RU 170, a RAN Intelligent Controller (MC) 175 (e.g., a Near-Real Time MC (Near-RT RIC), a Non-Real Time MC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reference signal pattern association for channel estimation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, or FR5, or may be within the EHF band.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Wireless communications system 100 may utilize a model, such as an ML model, to improve system performance, increase communication efficiency, etc. An ML model may be trained using input data, however, the ML model may have to be continuously updated to account for the newly generated data at one or more devices (e.g., UEs 115, network entities 105). Further, inconsistencies or perturbations associated with the input data used for the ML model may impact the output such that the ML model parameters may have changes that exceed a threshold. As such, some ML models may have security vulnerabilities that may be exposed by adversarial devices. That is, an adversarial device (e.g., an adversarial UE 115 or network entity 105) may tamper with the learning or training of the ML model to deceive ML algorithms into making errors by providing inaccurate data to a device that is training the ML model. As described herein, inaccurate data may include data that is intentionally deceptive (e.g., fake or unsupported data) or data that has errors (e.g., data measured by a device that has poor channel conditions or component issues). That is, an adversarial device (e.g., adversarial UE 115 or adversarial network entity 105) may be a hostile device intentionally sharing perturbed data (e.g., referred to as a poisoning attack) or a legitimate device with unclean data (e.g., due to misfunction in the device, for example). Further, an adversarial device that is intentionally deceptive may be referred to as a poisoning or causative attack in which an adversarial device perturbs a portion of the training data (e.g., input data) used in training an ML model.

As described herein, a poisoning attack may refer to an ML attack that takes place when an adversarial device injects perturbed data into the training pool (e.g., set of training data from one or more device) for the ML model and the model is trained to make errors such that its performance is negatively impacted. This may result in the boundary or model parameters of the model to shift in some way. For example, in a case of an ML-based linear two-class classifier, a single data point may impact a decision boundary for the ML model, and such challenges applies to any ML model. Poisoning attacks may be reliability attacks aimed to inject so much perturbed data into the data pool to change the model boundaries, and this in turn, affects the overall performance of the model. In some examples, with only a 3% training dataset poisoning, the accuracy performance can drop by 11%. Poisoning attacks may also be targeted attacks in which an adversarial device aims to induce a definite prediction from the ML model, which may be referred to as a backdoor in the ML model. The targeted attack changes the behaviors of the model on some specific data instances chosen by the attackers while keeping the model performance on the other data instances unaffected so that device training the model remains unaware of the attack. Similarly, training the ML model with corrupted (or unclean) data even if corruption was not intentional (due to misfunction at the device for example) can lead to the same results.

Depending on the use case, a data collection process may be performed at a UE 115 (e.g., through measuring some reference signals), at a network entity 105, or using a cooperation or coordination between both the network entity 105 and the UE 115. Data collected at different UEs 115 may be shared with one or more network entities 105 to train a global model (e.g., a system-wide model) that accounts for different environmental or operating conditions. In some cases, multiple network entities 105 or nodes of the core network 130 may exchange data or ML model updates to train a global ML model that may be more suitable (e.g., may generate more accurate output data) in different settings or conditions.

Additionally, or alternatively, federated learning may be used, which involves UEs 115 capable of training local models (e.g., UE-specific models) and share local model updates with a network entity 105. In such cases, an adversarial device (e.g., an adversarial UE 115) may provide perturbed data or perturbed model updates to intentionally mislead the ML model at the network entity 105 or Operations, Administration and Maintenance (OAM) entity. As federated learning has many use-cases, the UEs 115 may have knowledge of the ML model used in making the decision at the network entity 105 or OAM entity, and an adversarial UE 115 may better optimize the attack (data perturbation) based on this knowledge of the model (e.g., to confuse or mislead the training of the ML model).

Techniques herein relate to the detection of corrupted, perturbed, or unclean datasets so that the detected datasets are excluded from training or testing and identifying whether the source of error is an adversarial device intentionally corrupting the data or a misfunctioning device corrupting the data. Detection may include gradient-based methods or statistic knowledge of training data focused on detecting outliers. In order to find the outliers, a sphere defense is used to remove data samples beyond a spherical radius and a slab defense is used to clear the data that is a threshold distance away from a line. In other examples, data may be into trusted data and untrusted data based on provenance features (source of the data and the metadata associated with the data samples). Then, the filtered and unfiltered models are trained with the untrusted dataset, and the model's performance is compared using the trusted data. If the model (e.g., classifier) trained without the segment (e.g., the filtered model) performs better (e.g., has a performance above a threshold) than the model (e.g., classifier) trained with the segment (e.g., the unfiltered model) on the trusted test set, then the segment is considered perturbed. Other detection techniques may include comparing error rates between the original model and a new model, which is retrained after injecting new data into the original training data. The added data can be considered malicious data and may be deleted when the error rate of the new model is higher than that of the original one (e.g., higher by a threshold).

Gradient-based techniques may derive a defensive mechanism against poisoning attacks based on the observations that norms and orientations of the gradients of poisoned datasets are different than legitimate datasets. Other defensive mechanisms against poisoning attacks using generative adversarial networks (GANs). GANs reconstruct training data using partial trusted data and assigns labels based on predicted results. The training data will be recognized as data from an attacker if the accuracy for the model is lower than a given threshold.

Wireless communications system 100 may support techniques for classifying trusted or untrusted devices or datasets associated with devices to improve model training and performance. For example, UE 115 may include a communications manager 101 that transmits or outputs information associated with the UE 115 as part of or for a data collection process. The information may be transmitted to a network entity 105 and may be associated with an ML model or training an ML model for one or more UEs 115 of the wireless communications system 100. The information may include one or more measurements performed by or associated with the UE 115 or other parameters of the UE 115 and may be used by the network entity 105 to determine whether the UE 115 or the information provided by the UE 115 is trusted or untrusted.

According to aspects herein, network entity 105 may include a communications manager 102 that receives or obtains information associated with a UE 115 for a ML model as part of a data collection process for one or more UEs 115. The communications manager 102 may predict an output of an ML model by performing outlier detection or determining a change in performance of an ML model to determine whether the information associated with the UE 115 or the UE 115 itself is trusted or untrusted. In some examples, the network entity 105 may assign a trust score, which may be a percentage value or quantized value, and may be associated with a given time duration, and classify the UE 115 or information from the UE 115 as untrusted or trusted.

Based on whether the UE 115 or the information associated with the UE 115 is trusted or untrusted, the network entity 105 may update or perform a model update process. For instance, if the UE 115 is considered trusted, the information or data from the UE 115 may be used to update an ML model by the network entity 105 using the communications manager 102. If the information or data from the UE 115 is considered untrusted, the network entity 105 may terminate a connection with the UE 115, restrict service for the UE 115, refrain from using data or information from the UE 115 in updating the ML model, or any combination thereof.

Figure 2:
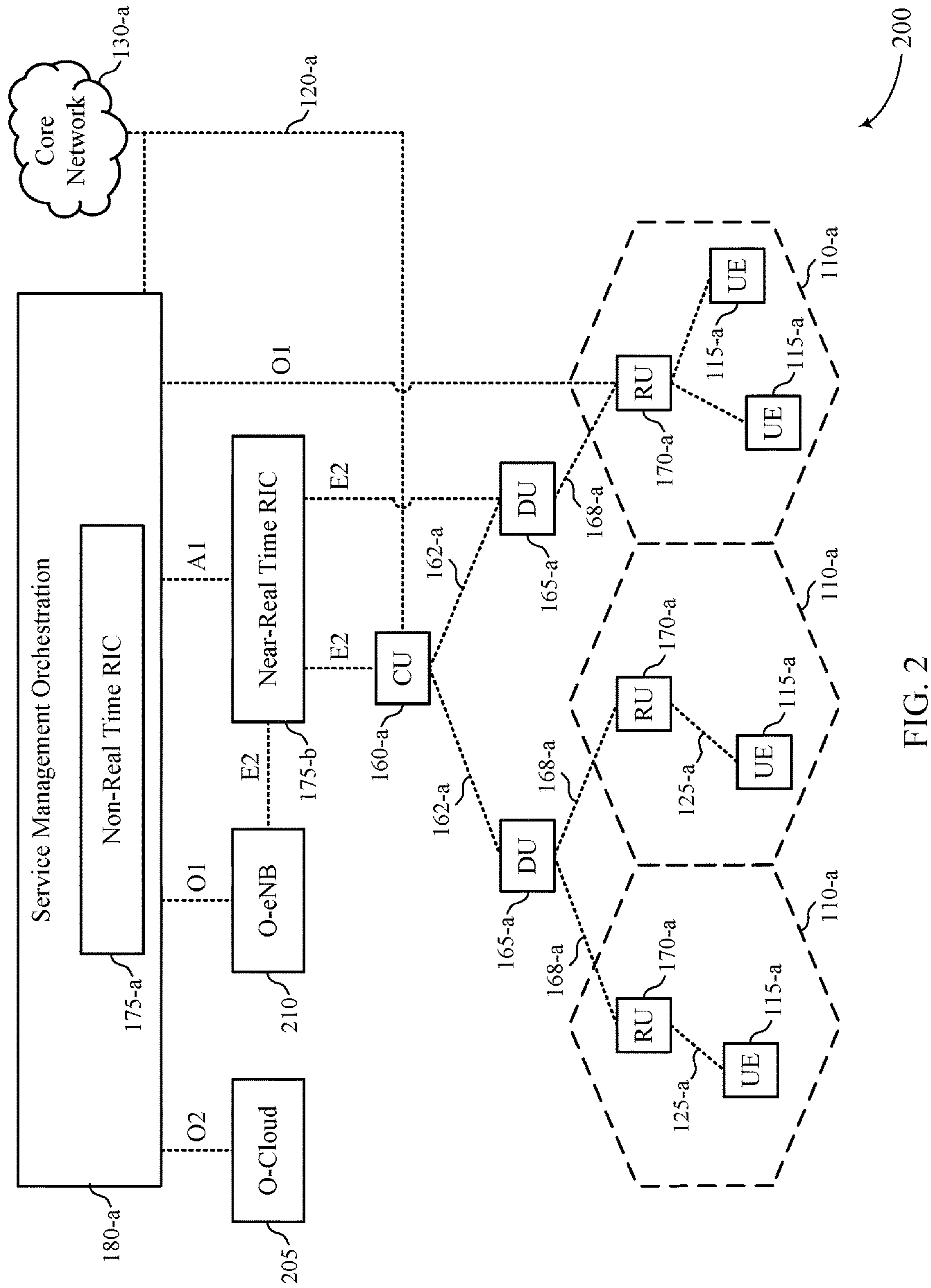
FIG. 2 illustrates an example of a network architecture that supports managing untrusted UEs for data collection in accordance with one or more aspects of the present disclosure.

FIG. 2 illustrates an example of a network architecture 200 that supports managing untrusted UEs for data collection in accordance with one or more aspects of the present disclosure. In some cases, the network architecture 200 may be an example of a disaggregated base station architecture or a disaggregated RAN architecture. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or machine learning workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT MC 175-*a* or the Near-RT RIC 175-*b* may be configured to tune RAN behavior or performance. For example, the Non-RT RIC 175-*a* may monitor long-term trends and patterns for performance and employ AI or machine learning models to perform corrective actions through the SMO 180-*a* (e.g., reconfiguration via 01) or via generation of RAN management policies (e.g., A1 policies).

In some examples of the network architecture 200, one or more network entities 105 may support machine learning techniques. For example, an RU 170-*a* may perform data collection to obtain data from one or more UEs 115-*a*. The RU 170-*a*, or another network entity 105 (e.g., a DU 165-*a*, a CU 160-*a*), may use the collected data to train a machine learning model (e.g., an artificial neural network). A network entity 105 (e.g., an RU 170-*a*, a DU 165-*a*, a CU 160-*a*), a UE 115-*a*, or both may deploy the trained machine learning model to operate in real time or near-real time. For example, a device deploying the trained machine learning model may input information to the machine learning model and may obtain an output from the machine learning model. The output may trigger one or more operations at the device, such as operations supporting network power savings, UE power savings, load balancing, mobility management, or any combination thereof. Additionally, or alternatively, the network entity 105 performing data collection, the network entity 105 performing model training, or both may use techniques described herein to determine whether information from a UE 115-*a* is trusted or untrusted for machine learning. A network entity 105 may refrain from using untrusted information (e.g., information from an untrusted UE 115-*a*) for model training to improve machine learning reliability and security.

Figure 3:
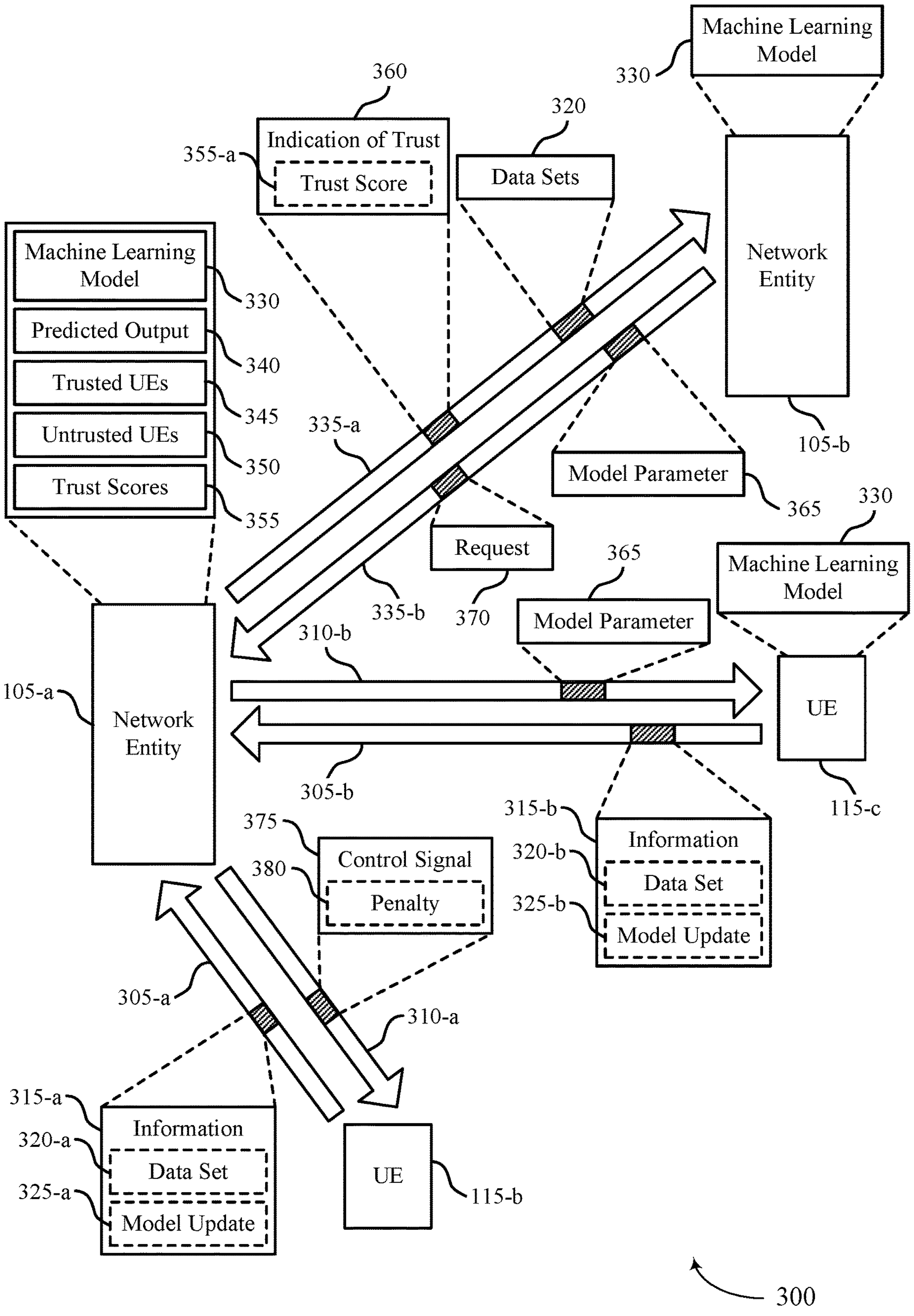
FIG. 3 illustrates an example of a wireless communications system that supports managing untrusted UEs for data collection in accordance with one or more aspects of the present disclosure.

FIG. 3 illustrates an example of a wireless communications system 300 that supports managing untrusted UEs for data collection in accordance with one or more aspects of the present disclosure. The wireless communications system 300 may be an example of a wireless communications system 100 or a network architecture 200 as described herein with reference to FIGS. 1 and 2. The wireless communications system 300 may include a network entity 105-*a*, a network entity 105-*b*, a UE 115-*b*, and a UE 115-*c*, which may be examples of the corresponding devices described herein with reference to FIGS. 1 and 2. The wireless communications system 300 may support detecting and indicating untrusted UEs 115 (e.g., adversarial UEs 115)

providing data for machine learning to improve the reliability and security of the machine learning processes.

A first network entity 105-*a* may determine trust for a UE 115 or information received from a UE 115. For example, the first network entity 105-*a* (e.g., a base station 140, an RU, an OAM) may perform a data collection procedure, a machine learning model training procedure, or both. The first network entity 105-*a* may share the determined trust information (e.g., an indication of trust 360) with one or more other network entities 105, such as a second network entity 105-*b* (e.g., a neighboring base station 140, a neighboring RU, the OAM), such that multiple network entities 105 in the wireless communications system 300 may identify and track potentially adversarial UEs 115 (e.g., untrusted UEs 115).

For example, the first network entity 105-*a* may perform a data collection process. In some examples, the data collection process may involve the first network entity 105-*a* requesting—or otherwise obtaining—data sets 320 from one or more UEs 115. A first UE 115-*b* may provide information 315-*a* to the first network entity 105-*a* via an uplink channel 305-*a*, and a second UE 115-*c* may provide information 315-*b* to the first network entity 105-*a* via an uplink channel 305-*b*. The information 315-*a* may correspond to the UE 115-*b* and may include a data set 320-*a* associated with the UE 115-*b* (e.g., including metrics determined or measured by the UE 115-*b*), a model update 325-*a* (e.g., if the UE 115-*b* performs model training), or both. The information 315-*b* may similarly correspond to the UE 115-*c* and may include a data set 320-*b* associated with the UE 115-*b*, a model update 325-*b*, or both. The information 315-*a* and the information 315-*b* may be associated with a machine learning model 330. For example, the information 315-*a* and the information 315-*b* may include data for training the machine learning model 330, may include model updates for the machine learning model 330, may include data to input into a deployed version of the machine learning model 330, or any combination thereof. The first network entity 105-*a* or another network entity 105 (e.g., the second network entity 105-*b*) may train the machine learning model in accordance with the data collection process for multiple UEs 115 (e.g., the UE 115-*b* and the UE 115-*c*) associated with the machine learning model.

The first network entity 105-*a* may obtain the information corresponding to the UEs 115. The first network entity 105-*a* may perform one or more processes to determine whether the first network entity 105-*a* trusts the information obtained from the UEs 115, the UEs 115 sending the information, or some combination thereof. In some examples, the first network entity 105-*a* may perform outlier detection, anomaly detection, or both on a data set 320-*a* obtained from a UE 115-*b*. For example, if the data set 320-*a*—or a portion of the data set 320-*a*—satisfies an outlier threshold, the first network entity 105-*a* may predict that the data set 320-*a* or the portion of the data set 320-*a* may be perturbed (e.g., corrupted). In response, the first network entity 105-*a* may label the data set 320-*a*, the portion of the data set 320-*a*, or the UE 115-*b* that provided the data set 320-*a* as "untrusted." An "untrusted" UE 115 may potentially be an example of an adversarial UE 115 intentionally providing corrupted data to the network for machine learning operations. Alternatively, the untrusted UE 115 may potentially be malfunctioning and unintentionally corrupting the provided data. In either case, the network may label the UE 115-*b* as untrusted to avoid using information 315-*a* (e.g., a data set 320-*a*, a model update 325-*a*) received from the UE 115-*b* for machine learning.

In some other examples, the first network entity 105-*a* may predict an impact of the information received from the UEs 115 on the machine learning model 330 and may label the information or the UE 115 providing the information as untrusted if the information is predicted to cause a negative impact to the machine learning model 330. For example, the first network entity 105-*a* may determine that the data set 320-*a* obtained from the UE 115-*b* is expected to reduce the performance of the machine learning model 330 (e.g., based on a predicted output 340 of the machine learning model 330) and, in response, may label the data set 320-*a* or the UE 115-*b* as untrusted. Such an "untrusted" label may be an example of an indication of trust 360 corresponding to the information 315-*a* from a UE 115-*b* or corresponding to the UE 115-*b* itself.

Alternatively, based on outlier detection, anomaly detection, predicted impact, or any other detection metric, the first network entity 105-*a* may determine that information 315-*b* from a UE 115-*c* can be trusted. The first network entity 105-*a* may label the information 315-*b* (e.g., a data set 320-*b*, a model update 325-*b*) as trusted or may label the UE 115-*c* providing the information as trusted. Such a "trusted" label may be another example of an indication of trust 360 corresponding to the information 315-*b* from a UE 115-*c* or corresponding to the UE 115-*c* itself.

In some cases, the indication of trust 360 may be an example of a binary label (e.g., either "trusted" or "untrusted"). For example, a first binary value (e.g., a "1" value) may indicate trust for a data set 320 or a UE 115, while a second binary value (e.g., a "0" value) may indicate non-trust for the data set 320 or the UE 115. In some other cases, the indication of trust 360 may be an example of a trust score 355. The trust score 355 may be an example of a percentage value or a quantized value (e.g., high, medium, low) that indicates an amount of trust (e.g., on a scale). The trust score 355 may indicate a rating of the cleanness and legitimacy of a data set 320, a set of measurements, a model update, a UE 115, or any other information associated with a machine learning procedure.

The first network entity 105-*a* or another network entity 105 (e.g., a core network entity, an OAM) may assign the trust score 355 using any parameters or analytics operations. For example, a network entity 105 may determine the trust score 355 based on a "reject on negative impact" test. The network entity 105 may determine a predicted change (e.g., a drop or a gain) in performance for the machine learning model 330 if a data set 320-*a* is included in or excluded from training or testing the machine learning model 330. The network entity 105 may assign the trust score 355-*a* for the data set 320-*a* based on the magnitude of the performance change. In another example (e.g., if the first network entity 105-*a* is training the machine learning model 330 for interference prediction), if the data set 320-*a* includes measurements indicating a relatively low interference setting for the UE 115-*b*, but the first network entity 105-*a* determines that the data set 320-*a* should indicate a relatively high interference setting (e.g., based on measurements from other UEs 115 neighboring the UE 115-*b*), the first network entity 105-*a* may assign a relatively low trust score 355-*a* to the data set 320-*a*, indicating relatively low confidence in the cleanness, legitimacy, or both of the data set 320-*a*.

The first network entity 105-*a* may share one or more indications of trust 360 with one or more other network entities 105, for example, to protect against adversarial UEs 115 negatively affecting the other network entities 105. For example, the first network entity 105-*a* may output, via a backhaul channel 335-*a* or other channel to the second network entity 105-*b* (e.g., a neighboring base station, the OAM, a core network entity), a signal indicating an indication of trust 360 corresponding to the UE 115-*b*. In some cases, the first network entity 105-*a* may send the indication of trust 360 in response to a request 370 obtained from the second network entity 105-*b*. The indication of trust 360 may indicate whether the UE 115-*b* is one of untrusted or trusted. For example, the indication of trust 360 may indicate that the first network entity 105-*a* suspects the UE 115-*b* is an adversarial UE. If the UE 115-*b* moves within the coverage area of the second network entity 105-*b*, the second network entity 105-*b* may treat information 315-*a* (e.g., a data set 320-*a*, measurements, a model update 325-*a*) obtained from the UE 115-*b* with caution (e.g., as untrusted information) if the first network entity 105-*a* and the second network entity 105-*b* are nodes in a federated learning setting.

In some examples, the indication of trust 360 may include or be an example of a trust score 355-*a* for the data set 320-*a* or the UE 115-*b*. The second network entity 105-*b* may determine whether to use the data set 320-*a* for training the machine learning model 330 based on the trust score 355-*a*. For example, the second network entity 105-*b* may compare the trust score 355-*a* to a threshold trust level. If the trust score 355-*a* satisfies the threshold trust level, the second network entity 105-*b* may use the corresponding data set 320-*a* for model training. Alternatively, if the trust score 355-*a* fails to satisfy the threshold trust level, the second network entity 105-*b* may refrain from using the corresponding data set 320-*a* for model training. Accordingly, the second network entity 105-*b* may receive data sets 320 for model training, where the data sets 320 correspond to different UEs 115. The second network entity 105-*b* may use a first data set 320-*b* for model training based on a trust score 355 for the first data set 320-*b* satisfying a threshold, and the second network entity 105-*b* may refrain from using a second data set 320-*a* for model training based on a trust score 355 for the second data set 320-*a* failing to satisfy the threshold. The second network entity 105-*b* may output one or more model parameters 365 (e.g., to the first network entity 105-*a* via a backhaul channel 335-*b* or other channel) for the machine learning model 330 trained using a subset of the data sets 320 in accordance with the trust scores 355.

The network (e.g., the first network entity 105-*a* or a database associated with the network) may store information associated with untrusted UEs 115 (e.g., potentially adversarial UEs). For example, the OAM or another core network entity may store a database of UEs 115 participating in data collection for one or more machine learning procedures. In some cases, the database (e.g., a database at the first network entity 105-*a* or another network entity) may store trust information for all UEs 115 participating in the data collection. In some other cases, the database may store trust information for trusted UEs 115, untrusted UEs 115, or both. For example, the database may store a list of trusted UEs 345, a list of untrusted UEs 350, or both. In some examples, the database may store a trust score 355 for each UE 115 in a list at the database.

The database may be accessed by base stations in the wireless communications system 300. In some examples, a network entity 105 (e.g., a base station, an RU) may retrieve trust information for multiple UEs 115 from the database. In some other examples (e.g., to support database privacy), the network entity 105 may request trust information for one or more specific UEs 115 from the database, and the network entity hosting or otherwise communicating with the database (e.g., the OAM, a core network entity) may respond to the request with trust information from the database for the one or more specific UEs 115. The trust information may include a trust score 355, whether the UE 115 is predicted to be adversarial, whether the UE 115 is untrusted, or any combination thereof.

In some examples, the network entity 105 hosting or otherwise communicating with the database may control data inclusion or exclusion for model training, model testing, model validation, or any other machine learning operations. For example, the network entity 105 (e.g., the first network entity 105-*a*) may exclude data corresponding to a trust score 355 that is below a threshold for model training, model testing, model validation, or some combination thereof. Additionally, or alternatively, the network entity 105 may share a list of trusted UEs 115, where the data for the trusted UEs 115 may be included in model training, model testing, model validation, or some combination thereof (e.g., based on respective trust scores 355 for these trusted UEs 115). Additionally, or alternatively, the network entity 105 may share a list of untrusted UEs 115, where the data for the untrusted UEs 115 may be excluded from model training, model testing, model validation, or some combination thereof (e.g., based on respective trust scores 355 for these untrusted UEs 115). In some other examples, the network entity 105 may access the trust scores 355 for UEs 115 and may share the trust scores 355 with one or more devices performing machine learning operations. A device performing a machine learning operation may determine whether to use a data set 320 for the machine learning operation based on an implementation-based procedure (e.g., any metric or analysis based on an indication of trust 360).

In some cases, a network entity 105 (e.g., the second network entity 105-*b*) may request adding one or more new UEs 115 to the database, for example, if the new UEs 115 participate in data collection. The network entity 105 may provide an estimated trust score 355 for a new UE 115 to add to the database. In some cases, the network entity 105 may additional indicate whether a new UE 115 is predicted to be adversarial (e.g., based on the UE's behavior). For example, if a UE 115 consistently or frequently shares outlier data or data predicted to negatively impact a machine learning model 330 during data collection, the network entity 105 may predict that the UE 115 is an adversarial UE intentionally corrupting the data. The database may store an indication that the UE 115 is untrusted and, in some cases, may additionally store an indication that the UE 115 is predicted to be adversarial.

For example, the database may store an indication of whether the network (e.g., a network entity) predicts that an untrusted UE 115 is an adversarial UE intentionally sharing corrupted data or a legitimate UE unintentionally sharing corrupted data. In some examples, the network may handle untrusted UEs 115 differently depending on whether the network predicts that the untrusted UE 115 is intentionally or unintentionally providing corrupted data for machine learning operations. For example, the network may apply a penalty 380 to an untrusted UE 115, where the penalty 380 may be based on whether the untrusted UE 115 is predicted to be an adversarial UE or a legitimate UE.

The network entity 105 hosting or otherwise communicating with the database may configure the penalty 380 for a UE 115. For example, the OAM or a core network entity may output a signal indicating the penalty 380 to a base station or RU (e.g., the first network entity 105-*a*). In some cases, to apply the penalty 380 to a UE 115-*b*, the first network entity 105-*a* may transmit a control signal 375 configuring the penalty 380 to the UE 115-*b* via a downlink channel 310-*a*. The type of penalty 380 may be a connection termination, a service restriction, or some other type of penalty 380. In some examples, the first network entity 105-*a* may configure the UE 115-*b* to refrain from, or otherwise stop, sending information 315-*a* (e.g., data sets 320-*a*, model updates 325-*a*) for data collection based on the penalty 380. For example, if the UE 115-*b* is predicted to be a legitimate UE providing unintentionally perturbed data for machine learning, the first network entity 105-*a* may restrict the UE 115-*b* from providing further data, measurements, or model updates that may not be trusted. In some other examples, the first network entity 105-*a* may terminate a connection with the UE 115-*b* or may restrict service for the UE 115-*b* (e.g., such that the service supports a subset of operations) based on the penalty 380. For example, if the UE 115-*b* is predicted to be an adversarial UE intentionally perturbing data for machine learning, the first network entity 105-*a* may lock the UE 115-*b* from accessing the network.

In yet some other examples, the first network entity 105-*a* may modify sharing machine learning information based on the penalty 380. For example, the OAM or a core network entity may configure a network entity 105 (e.g., a base station or RU) to refrain from sharing machine learning model parameters 365 with specific UEs 115, such as an untrusted UE 115-*b*. A machine learning model parameter 365 (e.g., a quantity of layers of the machine learning model 330, a weight of a node for the machine learning model 330, a bias for the machine learning model 330, or any other parameter) may provide information about the machine learning model 330 that could potentially risk further (or more targeted) attacks on the machine learning model 330. Accordingly, the network may refrain from sharing such machine learning model parameters 365 with untrusted UEs (e.g., adversarial UEs). Instead, the first network entity 105-*a* may share the machine learning model parameters 365 with trusted UEs 115, such as the UE 115-*c* via a downlink channel 310-*b* to update the machine learning model 330 at the UE 115-*c*. Additionally, or alternatively, the first network entity 105-*a* may exclude untrusted UEs 115 (e.g., adversarial UEs) from any future federated learning approaches for the network.

Figure 4:
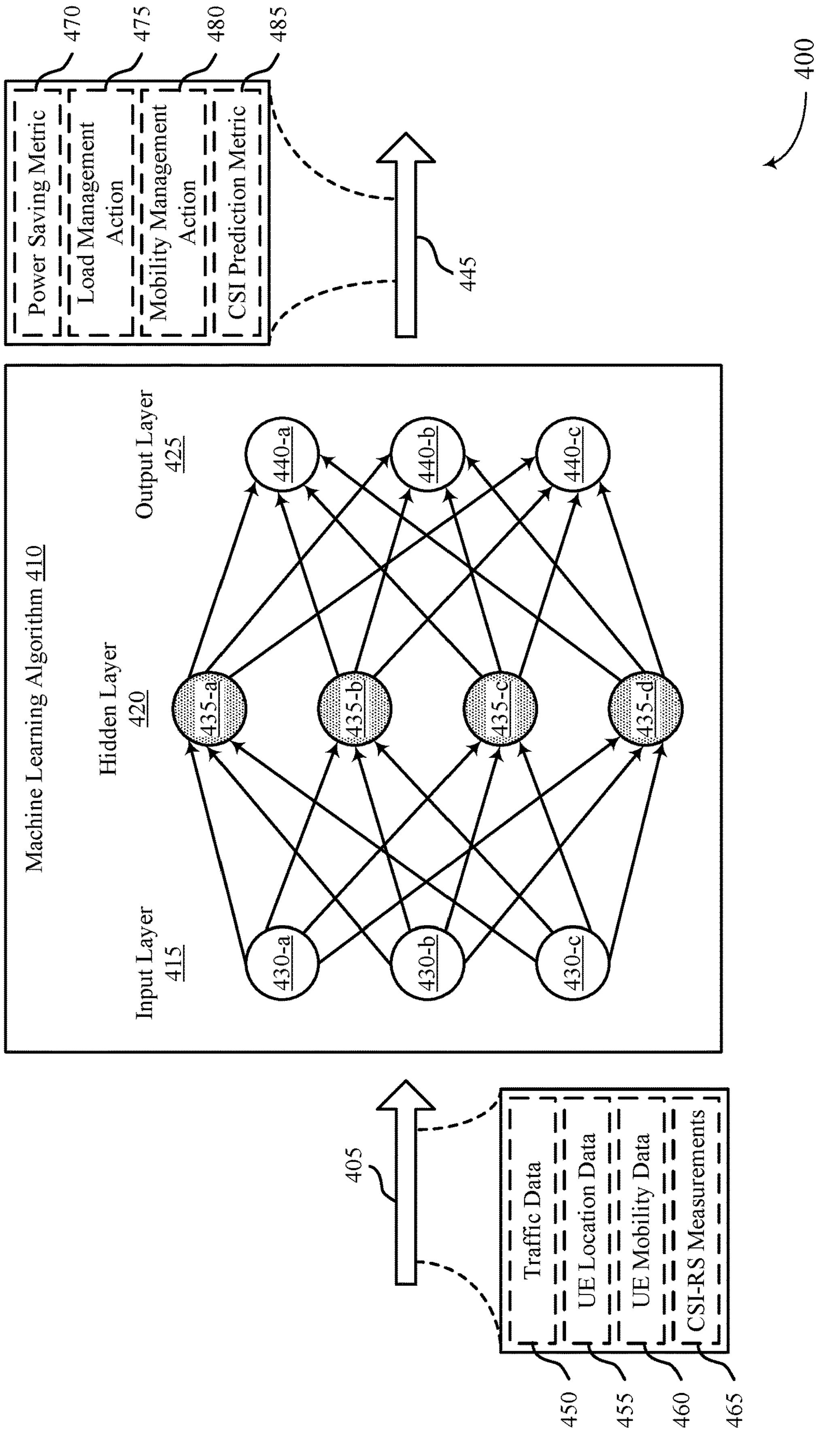
FIGS. 4 and 5 illustrate examples of machine learning processes that support managing untrusted UEs for data collection in accordance with one or more aspects of the present disclosure.

FIG. 4 illustrates an example of a machine learning process 400 that supports managing untrusted UEs for data collection in accordance with one or more aspects of the present disclosure. The machine learning process 400 may be implemented at a network entity 105 (e.g., an RU, a DU, a CU, an OAM, a core network entity) or another device supporting machine learning as described with reference to FIGS. 1 through 3. The machine learning process 400 may support training a machine learning model (e.g., an artificial neural network) for network power savings, UE power savings, load balancing, mobility management, or any combination of these or other processes improved by machine learning.

The machine learning process 400 may include a machine learning algorithm 410. As illustrated, the machine learning algorithm 410 may be an example of a neural network (e.g., an artificial neural network), such as an FF or DFF neural network, an RNN, an LSTM neural network, or any other type of neural network. However, any other machine learning algorithms may be supported. For example, the machine learning algorithm 410 may implement a nearest neighbor algorithm, a linear regression algorithm, a Naïve Bayes algorithm, a random forest algorithm, or any other machine learning algorithm. Furthermore, the machine learning process 400 may involve supervised learning, unsupervised learning, semi-supervised learning, reinforcement learning, or any combination thereof.

The machine learning algorithm 410 may include an input layer 415, one or more hidden layers 420, and an output layer 425. In a fully connected neural network with one hidden layer 420, each hidden layer node 435 may receive a value from each input layer node 430 as input, where each input may be weighted. These neural network weights may be based on a cost function that is revised during training of the machine learning algorithm 410. Similarly, each output layer node 440 may receive a value from each hidden layer node 435 as input, where the inputs are weighted. If post-deployment training (e.g., online training) is supported, memory may be allocated to store errors or gradients for reverse matrix multiplication. These errors or gradients may support updating the machine learning algorithm 410 based on output feedback. Training the machine learning algorithm 410 may support computation of the weights (e.g., connecting the input layer nodes 430 to the hidden layer nodes 435 and the hidden layer nodes 435 to the output layer nodes 440) to map an input pattern to a desired output outcome. This training may result in a device-specific machine learning algorithm 410 based on the historic application data and data transfer for a specific network entity 105 or UE 115.

In some examples, input values 405 may be sent to the machine learning algorithm 410 for processing. In some examples, preprocessing may be performed according to a sequence of operations on the input values 405 such that the input values 405 may be in a format that is compatible with the machine learning algorithm 410. The input values 405 may be converted into a set of k input layer nodes 430 at the input layer 415. In some cases, different measurements may be input at different input layer nodes 430 of the input layer 415. Some input layer nodes 430 may be assigned default values (e.g., values of 0) if the quantity of input layer nodes 430 exceeds the quantity of inputs corresponding to the input values 405. As illustrated, the input layer 415 may include three input layer nodes 430-*a*, 430-*b*, and 430-*c*. However, it is to be understood that the input layer 415 may include any quantity of input layer nodes 430 (e.g., 20 input nodes).

The machine learning algorithm 410 may convert the input layer 415 to a hidden layer 420 based on a quantity of input-to-hidden weights between the k input layer nodes 430 and the n hidden layer nodes 435. The machine learning algorithm 410 may include any quantity of hidden layers 420 as intermediate steps between the input layer 415 and the output layer 425. Additionally, each hidden layer 420 may include any quantity of nodes. For example, as illustrated, the hidden layer 420 may include four hidden layer nodes 435-*a*, 435-*b*, 435-*c*, and 435-*d*. However, it is to be understood that the hidden layer 420 may include any quantity of hidden layer nodes 435 (e.g., 10 input nodes). In a fully connected neural network, each node in a layer may be based on each node in the previous layer. For example, the value of hidden layer node 435-*a* may be based on the values of input layer nodes 430-*a*, 430-*b*, and 430-*c* (e.g., with different weights applied to each node value).

The machine learning algorithm 410 may determine values for the output layer nodes 440 of the output layer 425 following one or more hidden layers 420. For example, the machine learning algorithm 410 may convert the hidden layer 420 to the output layer 425 based on a quantity of hidden-to-output weights between the n hidden layer nodes 435 and the m output layer nodes 440. In some cases, n=m. Each output layer node 440 may correspond to a different output value 445 of the machine learning algorithm 410. As illustrated, the machine learning algorithm 410 may include three output layer nodes 440-*a*, 440-*b*, and 440-*c*, supporting three different threshold values. However, it is to be understood that the output layer 425 may include any quantity of output layer nodes 440. In some examples, post-processing may be performed on the output values 445 according to a sequence of operations such that the output values 445 may be in a format that is compatible with reporting the output values 445.

The machine learning process 400 may support model training for network power savings, UE power savings, load balancing, mobility management, channel measurements, beam management, or any other functionality supported by a network entity 105 or a UE 115. For example, a device (e.g., network entity 105 or other training device) may train a machine learning algorithm 410 (e.g., a machine learning model, a neural network) using one or more security techniques to mitigate negative effects from corrupted data. In some examples, the device may receive one or more indications of whether data can be trusted (e.g., one or more trust scores). If the device determines that a subset of data is untrusted, the device may refrain from using the untrusted data for training the machine learning algorithm 410. Instead, the device (e.g., a network entity 105) may train the machine learning algorithm 410 using trusted data (e.g., from one or more trusted UEs 115).

For example, the machine learning algorithm 410 may be trained, using trusted data, to receive a set of input values 405, which may represent traffic data 450, UE location data 455, UE mobility data 460, channel state information (CSI) reference signal (RS) measurements 465, or any combination of these or other input parameters for the machine learning algorithm 410. The machine learning algorithm 410 may process the set of input values 405, based on the processing, may output a set of output values 445, which may represent a power saving metric 470, a load management action 475, a mobility management action 480, a CSI prediction metric 485, or any combination of these or other output parameters for the machine learning algorithm 410. For example, a power saving metric 470 may trigger a device (e.g., a network entity 105, a UE 115) to perform a power saving operation, such as deactivating one or more antenna ports, entering a low power mode, or any other power saving operation. A load management action 475 may trigger a network entity 105 to perform one or more operations to balance the traffic load in the system, such as triggering handover of one or more UEs 115 from one cell to another to improve the balance of the traffic load between the cells. A mobility management action 480 may trigger a network entity 105 or a UE 115 to perform an operation to improve communication reliability based on UE movement, such as triggering handover of the UE 115 from a first cell to a second cell based on the UE 115 moving into the coverage area of the second cell. A CSI prediction metric 485 may indicate CSI feedback for a full channel, for example, based on a set of CSI-RS measurements 465. Additionally, or alternatively, the machine learning algorithm 410 may support other input values 405, output values 445, or both to support other AI-based improvements for a wireless communications system.

Figure 5:
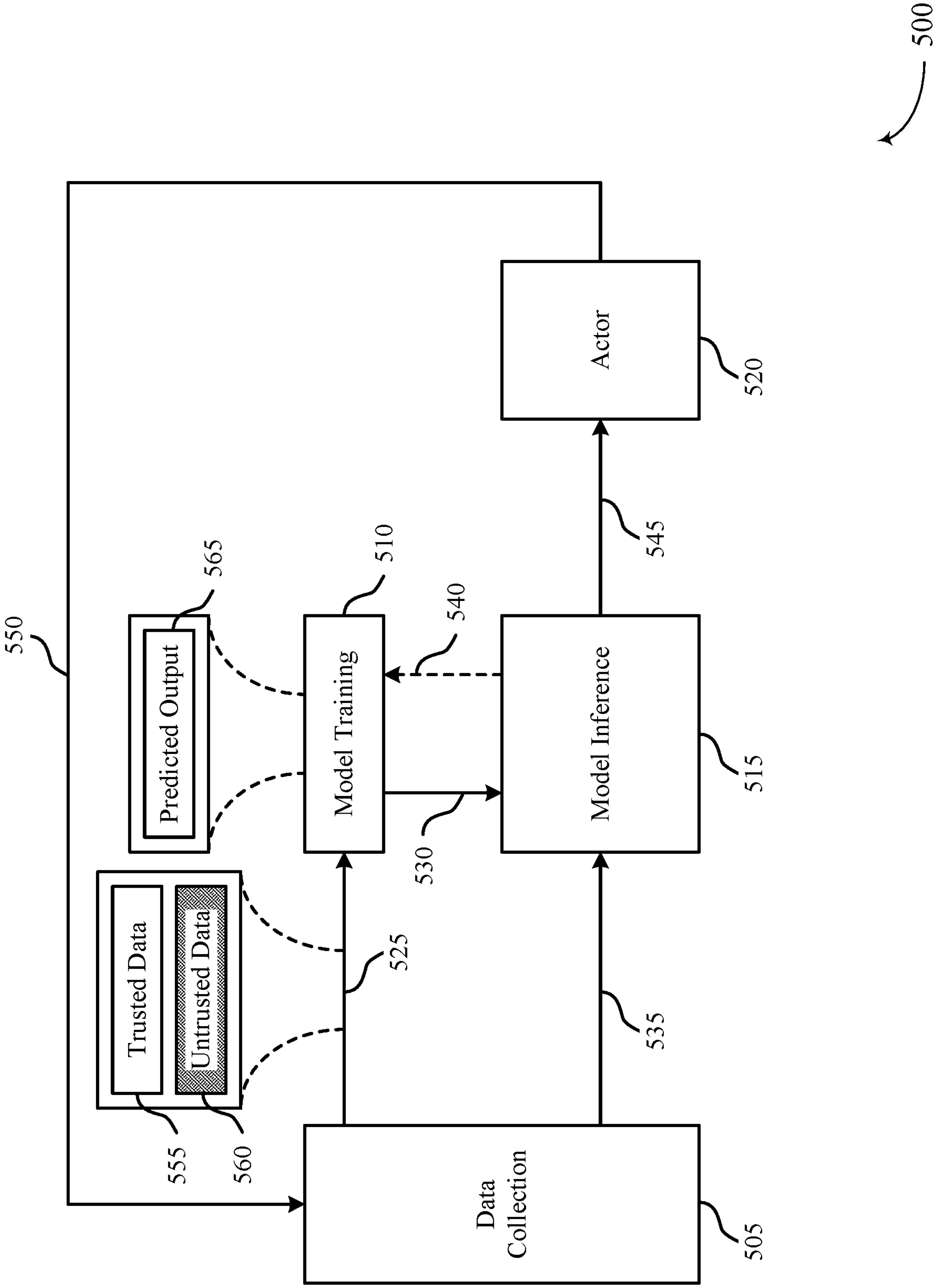

FIG. 5 illustrates an example of a machine learning process 500 that supports managing untrusted UEs for data collection in accordance with one or more aspects of the present disclosure. A network entity 105, such as a network entity described herein with reference to FIGS. 1 through 4, may perform the machine learning process 500. In some examples, multiple network entities 105 may perform one or more operations of the machine learning process 500. For example, a network entity 105 may perform data collection 505 to obtain data corresponding to one or more UEs 115. The network entity 105 or a different network entity 105 may perform model training 510 using data obtained based on the data collection 505. A network entity 105 may deploy a trained machine learning model as a model inference 515, and an output of the model inference 515 may be sent to an actor 520 (e.g., a network entity 105, a UE 115, or another device) for execution of a resulting action. In some cases, the model inference 515 may be an example of a machine learning algorithm 410 as described with reference to FIG. 4.

A network entity 105 may implement the machine learning process 500 as an AI or machine learning framework. The network entity 105 may use the machine learning process 500 to train a machine learning model (e.g., a machine learning algorithm, an AI algorithm, a neural network). The machine learning model may be an example of a data-driven algorithm determined by applying machine learning techniques. The data-driven algorithm may generate a set of one or more outputs including predicted information based on a set of one or more inputs. The network entity 105 may use the machine learning process 500 to train a machine learning model for implementation at a network entity 105, a UE 115, or both.

The machine learning process 500 may involve data collection 505. The data collection 505 may provide input data for model training, model inference functions, or both. In some examples, one or more network entities 105, such as RUs or next-generation RAN (NG-RAN) nodes, may perform the data collection 505. For example, a network entity 105 may obtain data (e.g., data sets) from one or more UEs 115. The data may include location information, handover information, channel metrics, traffic information, or any other data that may support machine learning techniques. A data set (e.g., a data set obtained from a specific UE 115) may support training, validation, testing, inference, or any combination thereof for the machine learning process 500.

The one or more network entities 105 performing the data collection 505 may send training data 525 (e.g., information obtained from one or more UEs 115) for model training 510, for example, at a network entity 105 (e.g., an RU, a DU, a CU, an NG-RAN node, an OAM, a core network entity). In some cases, the model training 510 (e.g., model generation) may involve machine learning model training, validation, testing, or some combination thereof. Additionally, or alternatively, the model training 510 may involve data preparation, such as data pre-processing, cleaning, formatting, transformation, or any combination thereof, to support training a machine learning model. The model training 510 may involve determining inputs to the model, outputs of the model, parameters of the model (e.g., node weights, node connections), or any combination thereof. The model training 510 may be performed offline (e.g., pre-deployment of the model), online (e.g., while the model is deployed and operating), or both. In some examples, the network entity 105 performing data collection 505 may determine whether training data is trusted data 555 or untrusted data 560. In some cases, the network entity 105 may send trusted data 555 for the model training 510 and may refrain from sending training data for the model training 510 if the training data is untrusted data 560 (e.g., predicted to be corrupted). Additionally, or alternatively, the network entity 105 performing the model training 510 may receive the training data 525 including the trusted data 555 and the untrusted data 560, and the network entity 105 may refrain from using the untrusted data 560 for the model training 510. For example, the network entity 105 may determine which subset of data of the training data 525 is untrusted (e.g., the untrusted data 560) based on a predicted output 565 of a machine learning model (e.g., an accuracy of a predicted output value from the model, a predicted change in performance for the model) trained using the model training 510.

The network entity 105 may determine a trained machine learning model based on the model training 510. The network entity 105 may deploy the trained machine learning model 530 as a model inference 515 or may otherwise update a previously-deployed model for the model inference 515. The model inference 515 may be deployed at a network entity 105 (e.g., an RU, a DU, a CU, an NG-RAN node), a UE 115, or both. The model inference 515 may operate on inference data 535 in real time or pseudo-real time. For example, a network entity 105 may perform data collection 505 and may send collected data (e.g., inference data 535) for processing by the model inference 515. In some examples, the model inference 515 may prepare the inference data 535 (e.g., including data pre-processing, cleaning, formatting, transformation, or any combination thereof) to input into the trained machine learning model 530. The network entity 105 may input values based on the inference data 535 into the trained machine learning model 530, and the trained machine learning model 530 may output one or more values representing or otherwise indicating one or more predictions, one or more decisions, one or more triggers, or any combination thereof.

In some examples, the model inference 515 may send model performance feedback 540 for additional model training 510. For example, a network entity 105 may perform model monitoring and model updating as parts of lifecycle management for a machine learning model. The network entity 105 may monitor a performance of a deployed machine learning model and may trigger an update to the model if the performance fails to satisfy a performance threshold (e.g., a reliability threshold, an accuracy threshold, an error threshold).

The model inference 515 may send the model inference output 545 to an actor 520. For example, the model inference output 545 may include one or more values output by the trained machine learning model 530. The actor 520 may be an example of a network entity 105 or a UE 115. The actor 520 (e.g., a device) may perform one or more actions in response to the model inference output 545. For example, the model inference output 545 may trigger the one or more actions at the actor 520, or the model inference output 545 may trigger one or more actions directed to other entities (e.g., other devices, other systems). In some cases, the actor 520 may provide feedback 550 to improve the data collection 505, the model training 510, or both.

The machine learning process 500 may be performed on the network-side, on the UE-side, or based on a collaboration between the network and one or more UEs 115. In some cases, the amount of collaboration between a network entity 105 and a UE 115 to support the machine learning may be based on the use case for the resulting machine learning model. For example, a device (e.g., a UE 115, a network entity 105) may train an implementation-based machine learning model without information exchange with other devices. Alternatively, a UE 115 and a network entity 105 may collaborate on the machine learning process 500 to train a machine learning model for separate or joint machine learning operation. For example, the trained machine learning model may be deployed at a UE 115, a network entity 105, or both and may operate on input data from the UE 115, the network entity 105, or both.

In some examples, a network entity 105 may train a machine learning model to support network energy savings. For example, the machine learning model may trigger one or more network energy saving operations based on an output of the machine learning model. In some cases, the machine learning model may trigger cell activation or deactivation based on traffic data. For example, the machine learning model may switch off one or more cells with relatively low traffic. Additionally, or alternatively, the machine learning model may trigger traffic offloading. For example, the machine learning model may offload UEs served by deactivated cells to new target cells. In some cases, the machine learning model may trigger a load reduction for a cell, a coverage modification for a cell, or both based on input data to the machine learning model.

In some examples, the network entity 105 may train a machine learning model to support load balancing. For example, the machine learning model may determine a distribution of UEs 115 or traffic between cells (e.g., between network entities 105 serving cells) to improve resource allocations for the cells. The machine learning model may output one or more values indicating a relatively even distribution of load among cells, among areas of cells, or both. Additionally, or alternatively, the one or more output values may trigger a system (e.g., a wireless communications system, a network architecture) to transfer a part of network traffic from relatively congested cells (e.g., cells handling a greater proportion of network traffic or greater than a network traffic threshold) or from relatively congested areas of cells. In some cases, the one or more output values may trigger the system to offload UEs 115 from one cell, a cell area, a carrier, a RAT, or some combination thereof to improve network performance. Additionally, or alternatively, the machine learning model may trigger handover procedures for UEs 115, improving handover parameters and handover actions between cells (e.g., between network entities 105, such as RUs).

In some examples, the network entity 105 may train a machine learning model to support mobility management. For example, the machine learning model may predict UE location, UE mobility, UE performance, or a combination thereof for one or more UEs 115. Such predictions may improve communication reliability and handover procedures. Additionally, or alternatively, the machine learning model may trigger traffic steering, for example, within a cell or between cells.

Additionally, or alternatively, the network entity 105 may train a machine learning model to support CSI feedback, beam management, positioning accuracy, or any combination thereof. For example, the machine learning model may improve CSI signaling overhead, improve CSI accuracy, improve CSI prediction, or any combination thereof. In some other cases, the machine learning model may predict a beam for communication in the time domain, the spatial domain, or both in order to improve overhead, latency, and accuracy associated with beam selection. In yet some other cases, the machine learning model may improve positioning accuracy for devices (e.g., UEs 115, network entities 105) in different scenarios (e.g., based on non-line of sight (NLOS) conditions). Additionally, or alternatively, the machine learning model may support any other predictions or triggers to improve network or UE operations.

Figure 6:
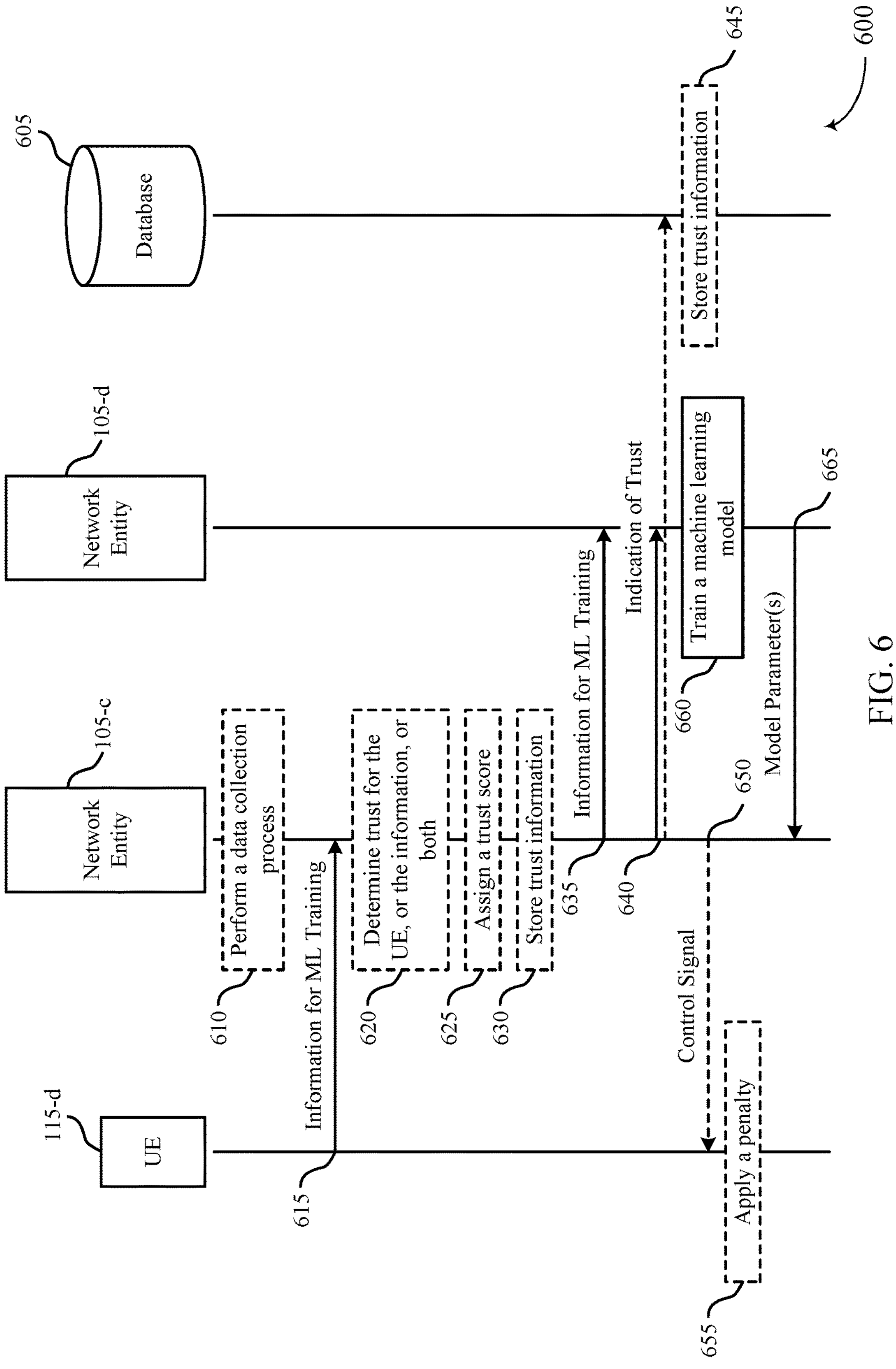
FIG. 6 illustrates an example of a process flow that supports managing untrusted UEs for data collection in accordance with one or more aspects of the present disclosure.

FIG. 6 illustrates an example of a process flow 600 that supports managing untrusted UEs for data collection in accordance with one or more aspects of the present disclosure. The process flow 600 may support communications between a UE 115-*d*, a network entity 105-*c*, a network entity 105-*d*, and a database 605. The UE 115-*d* may be an example of a UE as described herein. The network entities 105-*c* and 105-*d* may each be an example of a network entity as described herein. The database 605 may be an example of a server, a storage device, a database, or other device capable of storing information as described herein. In some examples, the database 605 may be in communication with or a component of the network entity 105-*c* or the network entity 105-*d*. For example, an OAM or a core network entity may host or otherwise communicate with the database 605. Alternative examples of the following process flow 600 may be implemented, where some steps are performed in a different order than described or are not performed at all. In some cases, steps may include additional features not mentioned below, or further steps may be added.

At 610, the network entity 105-*c* may perform a data collection process. For example, the network entity 105-*c* may perform a data collection process by obtaining information (e.g., data) from one or more UEs (e.g., UE 115-*d*), which may be used for training a model. The network entity 105-*c* may transmit a request for data to the one or more UEs and the one or more UEs may send data in response to the request. Additionally, or alternatively, the one or more UEs may send data to the network entity 105-*c* without a request being transmitted by the network entity 105-*c* (e.g., the one or more UEs may be configured to periodically send data to the network entity 105-*c* or may be requested by another device (e.g., a core network node) to send data to the network entity 105-*c*. In some examples, the information may be used as input data for training a model, such as a machine learning model, or model inference functions associated with the model or as part of training the model.

At 615, UE 115-*d* may provide information to the network entity 105-*c* for machine learning training. The information may include channel measurements, channel measurement values, location information, or other parameters of the UE 115-*d*. In some examples, the information may be associated with communications, channels, operating conditions, or operating parameters of the UE 115-*d*. The information may be associated with or used for model training, such as for training a machine learning model, which may include training data for the machine learning model, or one or more measurement values for the UE, or an update to the machine learning model.

At 620, the network entity 105-*c* may determine the trustworthiness of the UE 115-*d*, the information provided by the UE 115-*d* (e.g., at 615), or both. For instance, the network entity 105-*c* may perform outlier detection based on the information provided by or corresponding to the UE 115-*d*, which may be used to indicate whether the UE 115-*d*, the information provided by UE 115-*d*, or both are considered trusted or untrusted. In some examples, the network entity 105-*c* may predict an output of the machine learning model based on the information from the UE 115-*d* and in some cases, may determine a change in performance of the machine learning model based on the information provided by the UE 115-*d*. The predicted output, the change in performance, or both may be used to determine the trustworthiness of the UE 115-*d*, the information provided by the UE 115-*d*. For example, if the predicted output satisfies a threshold for data corruption based on the change in performance, the network entity 105-*c* may determine that the UE 115-*d*, the information provided by the UE 115-*d*, or both are untrusted.

At 625, to determine trustworthiness, the network entity 105-*c* may determine that the UE 115-*d*, the information provided by the UE 115-*d* (e.g., at 615), or both may be trusted or untrusted by assigning a trust score (e.g., a percentage value, a quantized value, or both), where the trust score indicates whether the UE 115-*d*, the information provided by the UE 115-*d*, or both are trusted or untrusted. The trust score may be associated with a given time period for data collection from the UE 115-*d*. For example, data from the UE 115-*d* may be untrusted for a specific time period, but data obtained from the UE 115-*d* corresponding to other time periods may be otherwise trusted.

At 630, the network entity 105-*c* may store the trustworthiness information based on determining trustworthiness of the UE 115-*d*, the information provided by the UE 115-*d*, or both. For example, the network entity 105-*c* may store a list of trusted UEs, a list of untrusted UEs, or both. In some examples, the network entity 105-*c* may store the trust scores for a set of UEs including the UE 115-*d*.

At 635, the network entity 105-*c* may transmit information corresponding to the UE 115-*d* for machine learning training to the network entity 105-*d*. For instance, if the network entity 105-*c* determines that the UE 115-*d*, the information provided by UE 115-*d*, or both are trusted, the network entity 105-*c* may transmit information for the network entity 105-*d* to use for training the machine learning model.

At 640, the network entity 105-*c* may transmit, to the network entity 105-*d*, the database 605, or both, information regarding whether the UE 115-*d*, the information provided by UE 115-*d*, or both is considered untrusted or trusted. In some cases, the information may include a trust score. In some examples, the network entity 105-*c* may transmit such information in response to a request from the network entity 105-*d* or the database 605.

At 645, the database 605 may store the trust information, which may include an indication of whether the UE 115-*d*, the information provided by UE 115-*d*, or both are considered trusted or untrusted (e.g., based on a trust score). In some cases, the database 605 may store trust scores for one or more UEs, or may store a list of trusted UEs, untrusted UEs, or both.

At 650, the network entity 105-*c* may transmit, and the UE 115-*d* may receive, a control signal. The control signal may configure the UE 115-*d* to refrain from the data collection process based at least in part on the UE 115-*d* being considered untrusted in accordance with a predicted output of the machine learning model based at least in part on the information corresponding to the UE 115-*d*.

At 655, the UE 115-*d* may apply a penalty in response to receiving the control signal at 650. In some examples, if the UE 115-*d* is considered untrusted, the network entity 105-*c* may output a configuration for the UE to refrain from the data collection process associated with the machine learning model, terminate a connection corresponding to the UE, restrict wireless service for the UE, output a parameter associated with the machine learning model to one or more UEs, where the UE 115-*d* is excluded from the one or more UEs, or a combination thereof (e.g., any of which may be referred to as applying a penalty to the UE 115-*d*). Additionally, or alternatively, the network entity 105-*c* may predict whether the UE is one of intentionally or unintentionally corrupting the information corresponding to the UE and may handle the information corresponding to the UE based on the prediction.

At 660, the network entity 105-*d* may train a machine learning model. For example, the network entity 105-*d* may train a machine learning model with one or more datasets from one or more UEs that are considered trusted. In some cases, the network entity 105-*d* may obtain multiple datasets (e.g., from the database 605 or the network entity 105-*c*) including both trusted and untrusted datasets and may train the machine learning model using one or more of the trusted datasets (e.g., refraining from using untrusted datasets). In some examples, the network entity 105-*d* may compare trust scores for one or more datasets and compare the trust scores to a threshold for data corruption. Based on the comparison, the network entity 105-*d* may train the machine learning model using datasets that have trust scores that are not associated with data corruption (e.g., datasets that fall below the threshold for data corruption).

After training the machine learning model, at 665, the network entity 105-*d* may transmit model parameters to the network entity 105-*c*. The model parameters may represent the trained machine learning model and may be used for subsequent operations by the network entity 105-*d*, the network entity 105-*c*, or both.

Figure 7:
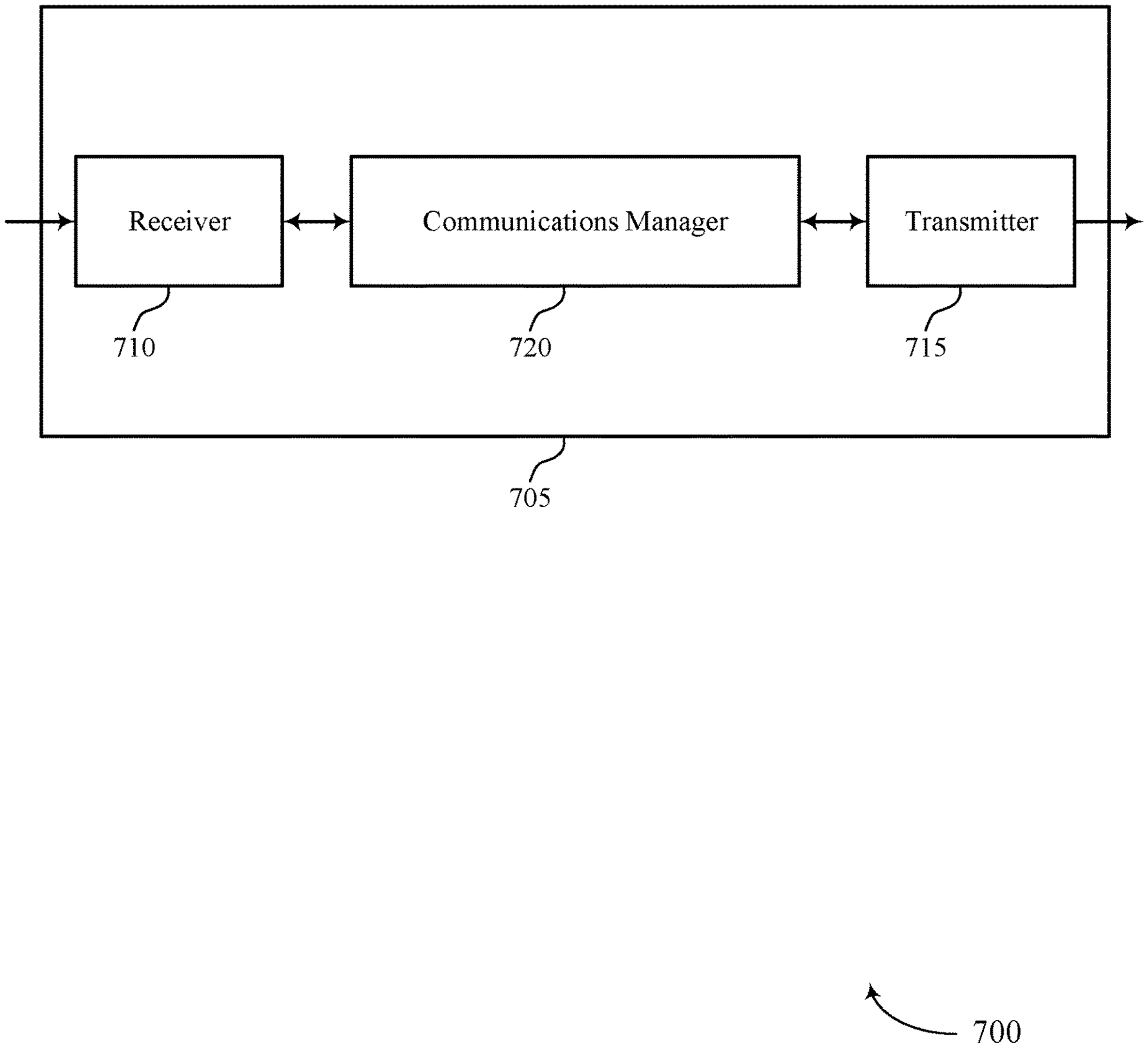
FIGS. 7 and 8 show block diagrams of devices that support managing untrusted UEs for data collection in accordance with one or more aspects of the present disclosure.

FIG. 7 shows a block diagram 700 of a device 705 that supports managing untrusted UEs for data collection in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of managing untrusted UEs for data collection as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first network entity in accordance with examples as disclosed herein. For example, the communications manager 720 may be configured as or otherwise support a means for obtaining information corresponding to a UE, the information associated with a machine learning model, and the machine learning model trained in accordance with a data collection process for a set of multiple UEs associated with the machine learning model. The communications manager 720 may be configured as or otherwise support a means for outputting an indication that the information corresponding to the UE is considered one of untrusted or trusted in accordance with a predicted output of the machine learning model, the predicted output of the machine learning model being based on the information corresponding to the UE.

Additionally, or alternatively, the communications manager 720 may support wireless communications in accordance with examples as disclosed herein. For example, the communications manager 720 may be configured as or otherwise support a means for obtaining a set of multiple data sets corresponding to a set of multiple UEs. The communications manager 720 may be configured as or otherwise support a means for training a machine learning model with a first data set of the set of multiple data sets based on the first data set corresponding to a first UE of the set of multiple UEs that is considered trusted. The communications manager 720 may be configured as or otherwise support a means for outputting an output parameter of the machine learning model based on the training.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for improving machine learning processes. For example, the device 705 may improve the reliability and security of machine learning model training, effectively improving the resulting machine learning models. Such machine learning models may improve the processing overhead at the device 705. Additionally, or alternatively, the device 705 may improve a processing overhead associated with data collection based on configuring untrusted UEs 115 to refrain from data collection procedures.

Figure 8:
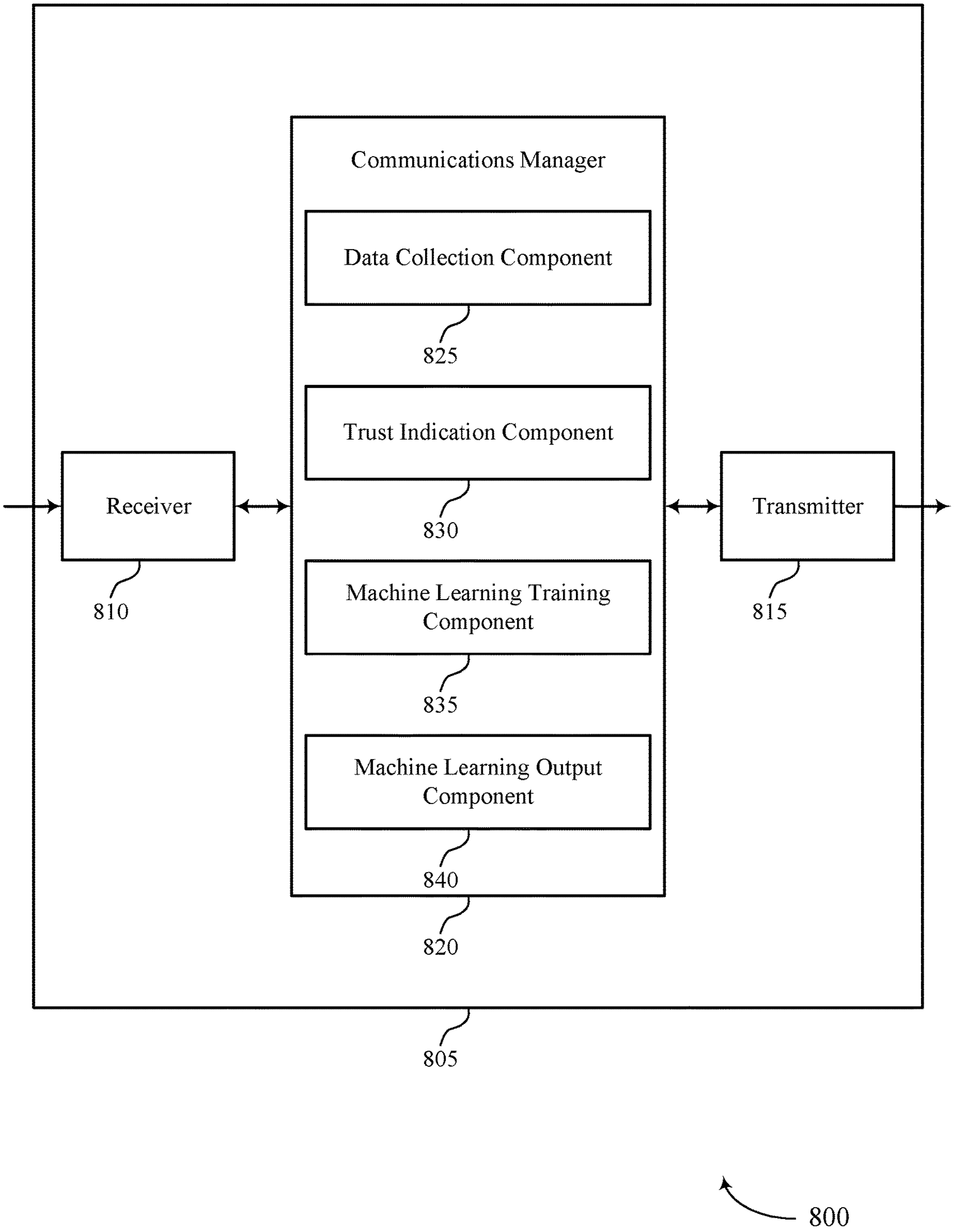

FIG. 8 shows a block diagram 800 of a device 805 that supports managing untrusted UEs for data collection in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of managing untrusted UEs for data collection as described herein. For example, the communications manager 820 may include a data collection component 825, a trust indication component 830, a machine learning training component 835, a machine learning output component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first network entity in accordance with examples as disclosed herein. The data collection component 825 may be configured as or otherwise support a means for obtaining information corresponding to a UE, the information associated with a machine learning model, and the machine learning model trained in accordance with a data collection process for a set of multiple UEs associated with the machine learning model. The trust indication component 830 may be configured as or otherwise support a means for outputting an indication that the information corresponding to the UE is considered one of untrusted or trusted in accordance with a predicted output of the machine learning model, the predicted output of the machine learning model being based on the information corresponding to the UE.

Additionally, or alternatively, the communications manager 820 may support wireless communications in accordance with examples as disclosed herein. The data collection component 825 may be configured as or otherwise support a means for obtaining a set of multiple data sets corresponding to a set of multiple UEs. The machine learning training component 835 may be configured as or otherwise support a means for training a machine learning model with a first data set of the set of multiple data sets based on the first data set corresponding to a first UE of the set of multiple UEs that is considered trusted. The machine learning output component 840 may be configured as or otherwise support a means for outputting an output parameter of the machine learning model based on the training.

Figure 9:
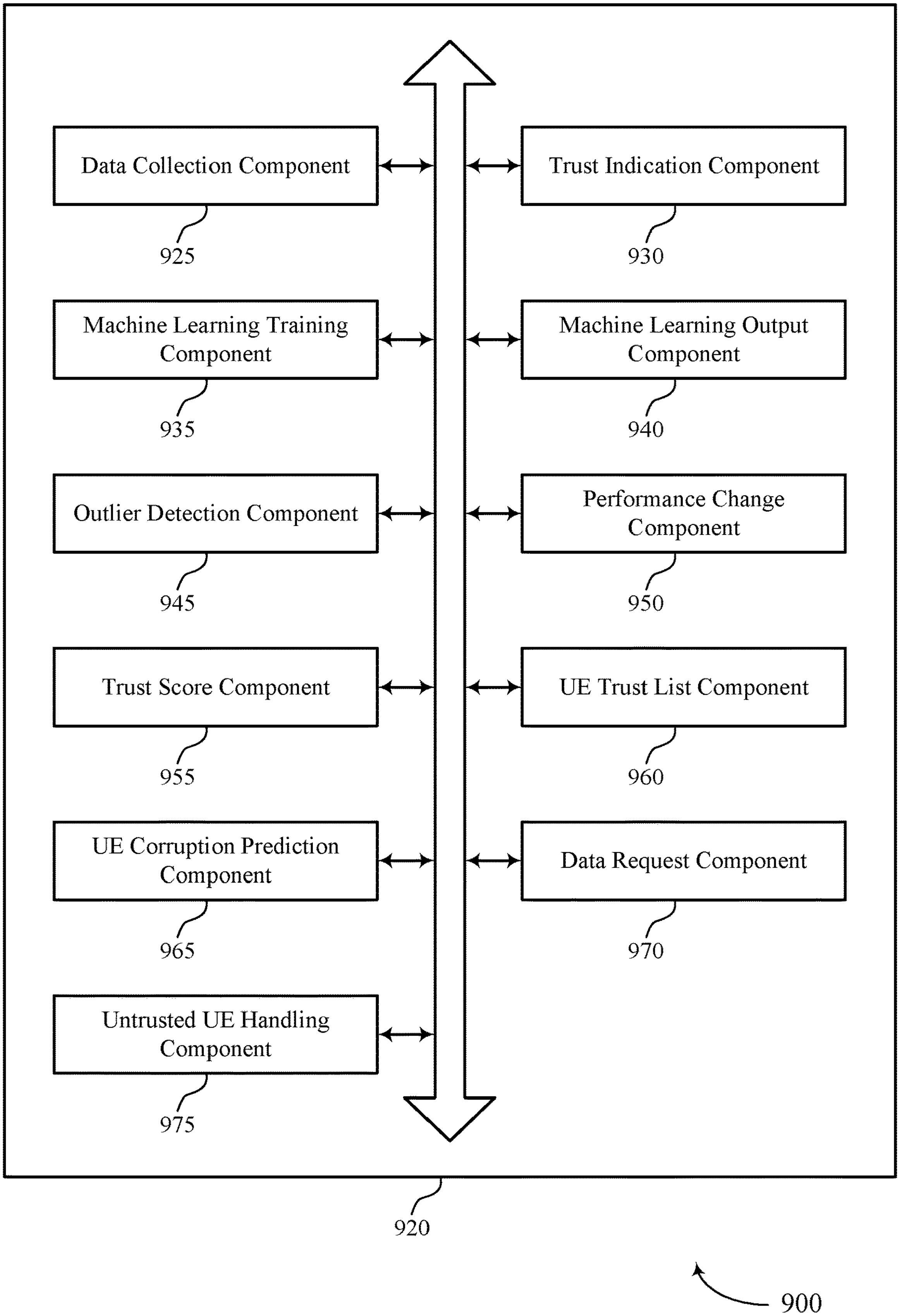
FIG. 9 shows a block diagram of a communications manager that supports managing untrusted UEs for data collection in accordance with one or more aspects of the present disclosure.

FIG. 9 shows a block diagram 900 of a communications manager 920 that supports managing untrusted UEs for data collection in accordance with one or more aspects of the present disclosure. The communications manager 920 may be an example of aspects of a communications manager 720, a communications manager 820, or both, as described herein. The communications manager 920, or various components thereof, may be an example of means for performing various aspects of managing untrusted UEs for data collection as described herein. For example, the communications manager 920 may include a data collection component 925, a trust indication component 930, a machine learning training component 935, a machine learning output component 940, an outlier detection component 945, a performance change component 950, a trust score component 955, a UE trust list component 960, a UE corruption prediction component 965, a data request component 970, an untrusted UE handling component 975, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications at a first network entity in accordance with examples as disclosed herein. The data collection component 925 may be configured as or otherwise support a means for obtaining information corresponding to a UE, the information associated with a machine learning model, and the machine learning model trained in accordance with a data collection process for a set of multiple UEs associated with the machine learning model. The trust indication component 930 may be configured as or otherwise support a means for outputting an indication that the information corresponding to the UE is considered one of untrusted or trusted in accordance with a predicted output of the machine learning model, the predicted output of the machine learning model being based on the information corresponding to the UE.

In some examples, the outlier detection component 945 may be configured as or otherwise support a means for performing outlier detection on the information corresponding to the UE, where the information corresponding to the UE is considered one of untrusted or trusted based on the outlier detection.

In some examples, the performance change component 950 may be configured as or otherwise support a means for determining a change in performance of the machine learning model based on the information corresponding to the UE, where the predicted output of the machine learning model satisfies a threshold for data corruption based on the change in performance.

In some examples, the trust score component 955 may be configured as or otherwise support a means for assigning a trust score to the information corresponding to the UE in accordance with the predicted output of the machine learning model, where the indication that the information corresponding to the UE is considered one of untrusted or trusted includes the trust score. In some examples, the trust score includes a percentage value or a quantized value or both. In some examples, the trust score is associated with a time period for data collection from the UE.

In some examples, the data collection component 925 may be configured as or otherwise support a means for obtaining additional information corresponding to the UE, the additional information associated with the machine learning model. In some examples, the trust indication component 930 may be configured as or otherwise support a means for classifying the additional information corresponding to the UE as untrusted based on the information corresponding to the UE being considered untrusted.

In some examples, to support outputting the indication that the information corresponding to the UE is considered one of untrusted or trusted, the trust indication component 930 may be configured as or otherwise support a means for outputting, for a database configured to store UE information for the data collection process, the indication that the information corresponding to the UE is considered one of untrusted or trusted.

In some examples, the UE trust list component 960 may be configured as or otherwise support a means for storing a list of trusted UEs, or a list of untrusted UEs, or both based on the information corresponding to the UE being considered one of untrusted or trusted.

In some examples, the UE corruption prediction component 965 may be configured as or otherwise support a means for predicting whether the UE intentionally corrupted the information corresponding to the UE. In some examples, the UE corruption prediction component 965 may be configured as or otherwise support a means for handling the information corresponding to the UE based on the predicting.

In some examples, the data request component 970 may be configured as or otherwise support a means for obtaining a request for the information corresponding to the UE, where the indication that the information corresponding to the UE is considered one of untrusted or trusted is output in response to the request.

In some examples, the untrusted UE handling component 975 may be configured as or otherwise support a means for outputting a configuration for the UE to refrain from the data collection process associated with the machine learning model based on the information corresponding to the UE being considered untrusted.

In some examples, the untrusted UE handling component 975 may be configured as or otherwise support a means for terminating a connection corresponding to the UE based on the information corresponding to the UE being considered untrusted.

In some examples, the untrusted UE handling component 975 may be configured as or otherwise support a means for restricting wireless service for the UE based on the information corresponding to the UE being considered untrusted.

In some examples, the untrusted UE handling component 975 may be configured as or otherwise support a means for outputting a parameter associated with the machine learning model to one or more UEs, where the UE is excluded from the one or more UEs based on the information corresponding to the UE being considered untrusted.

In some examples, the information corresponding to the UE includes training data for the machine learning model, or one or more measurement values for the UE, or an update to the machine learning model, or a combination thereof.

Additionally, or alternatively, the communications manager 920 may support wireless communications in accordance with examples as disclosed herein. In some examples, the data collection component 925 may be configured as or otherwise support a means for obtaining a set of multiple data sets corresponding to a set of multiple UEs. The machine learning training component 935 may be configured as or otherwise support a means for training a machine learning model with a first data set of the set of multiple data sets based on the first data set corresponding to a first UE of the set of multiple UEs that is considered trusted. The machine learning output component 940 may be configured as or otherwise support a means for outputting an output parameter of the machine learning model based on the training.

In some examples, the machine learning training component 935 may be configured as or otherwise support a means for refraining from training the machine learning model using a second data set of the set of multiple data sets based on the second data set corresponding to a second UE of the set of multiple UEs that is considered untrusted.

In some examples, to support obtaining the set of multiple data sets, the trust indication component 930 may be configured as or otherwise support a means for obtaining a set of multiple indications indicating whether the set of multiple data sets, or the set of multiple UEs, or both are considered untrusted, where the machine learning model is trained based on the set of multiple indications.

In some examples, to support obtaining the set of multiple data sets, the trust score component 955 may be configured as or otherwise support a means for obtaining a set of multiple trust scores corresponding to the set of multiple data sets, or the set of multiple UEs, or both. In some examples, to support obtaining the set of multiple data sets, the trust score component 955 may be configured as or otherwise support a means for comparing the set of multiple trust scores to a threshold for data corruption, where the machine learning model is trained based on the comparing.

In some examples, the data request component 970 may be configured as or otherwise support a means for outputting a request for the set of multiple data sets, where the set of multiple data sets is obtained in response to the request.

In some examples, the set of multiple data sets is obtained from a network entity, or a database, or both.

Figure 10:
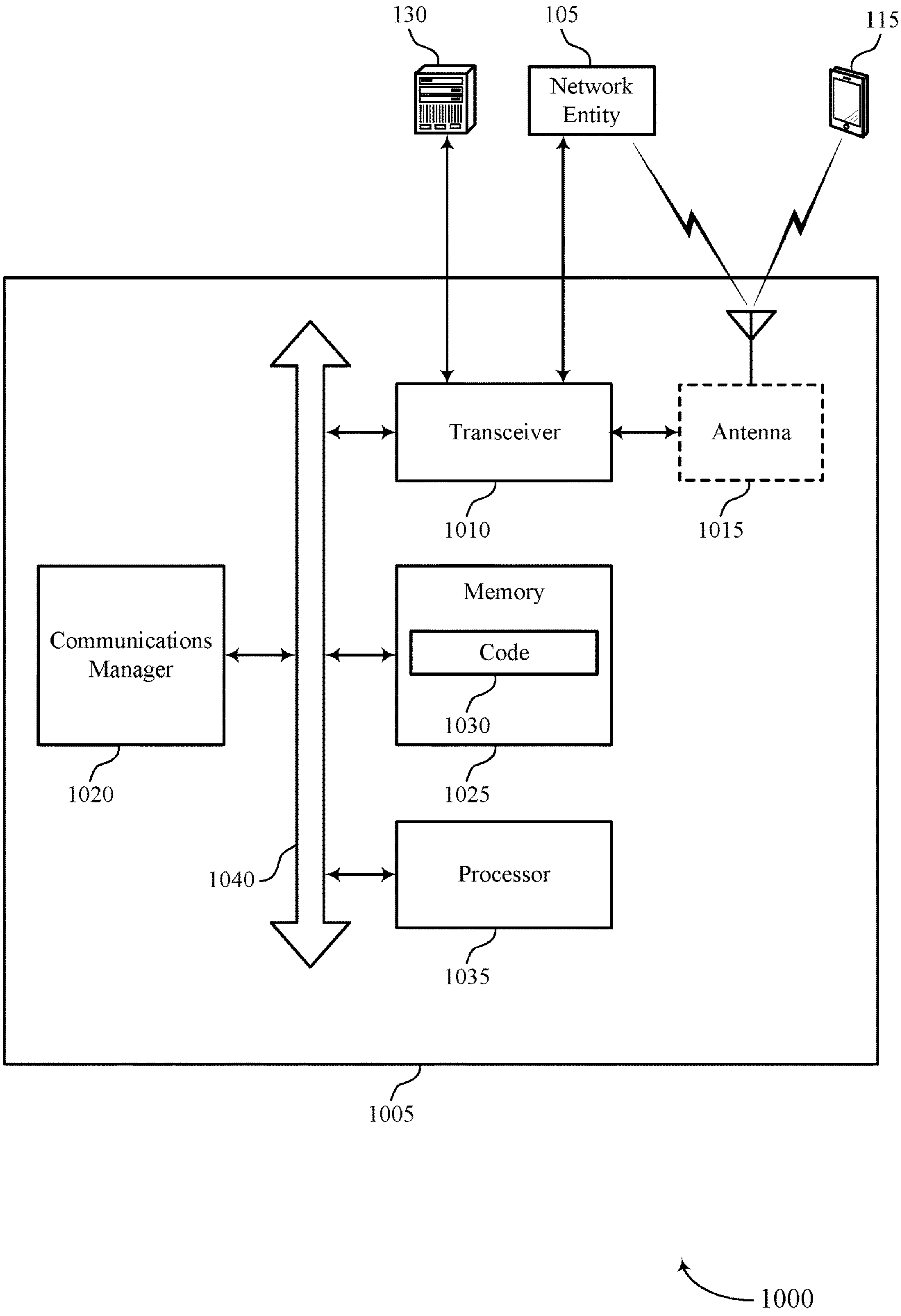
FIG. 10 shows a diagram of a system including a device that supports managing untrusted UEs for data collection in accordance with one or more aspects of the present disclosure.

FIG. 10 shows a diagram of a system 1000 including a device 1005 that supports managing untrusted UEs for data collection in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some examples, the transceiver may be operable to support communications via one or more communications links (e.g., a communication link 125, a backhaul communication link 120, a midhaul communication link 162, a fronthaul communication link 168).

The memory 1025 may include random access memory (RAM) and read-only memory (ROM). The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a basic input/output (I/O) system (BIOS) which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting managing untrusted UEs for data collection). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005 and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a first network entity in accordance with examples as disclosed herein. For example, the communications manager 1020 may be configured as or otherwise support a means for obtaining information corresponding to a UE, the information associated with a machine learning model, and the machine learning model trained in accordance with a data collection process for a set of multiple UEs associated with the machine learning model. The communications manager 1020 may be configured as or otherwise support a means for outputting (e.g., for a second network entity) an indication that the information corresponding to the UE is considered one of untrusted or trusted in accordance with a predicted output of the machine learning model, the predicted output of the machine learning model being based on the information corresponding to the UE.

Additionally, or alternatively, the communications manager 1020 may support wireless communications in accordance with examples as disclosed herein. For example, the communications manager 1020 may be configured as or otherwise support a means for obtaining a set of multiple data sets corresponding to a set of multiple UEs. The communications manager 1020 may be configured as or otherwise support a means for training a machine learning model with a first data set of the set of multiple data sets based on the first data set corresponding to a first UE of the set of multiple UEs that is considered trusted. The communications manager 1020 may be configured as or otherwise support a means for outputting an output parameter of the machine learning model based on the training.

By including or configuring the communications manager 1020 in accordance with examples as described herein, the device 1005 may support techniques for improving machine learning processes. For example, the device 1005 may improve the reliability and security of machine learning model training, effectively improving the resulting machine learning models. The device 1005 may additionally, or alternatively, protect against corrupt data skewing machine learning training and model outputs, improving any processes involving machine learning operations for a wireless communications system.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of managing untrusted UEs for data collection as described herein, or the processor 1035 and the memory 1025 may be otherwise configured to perform or support such operations.

Figure 11:
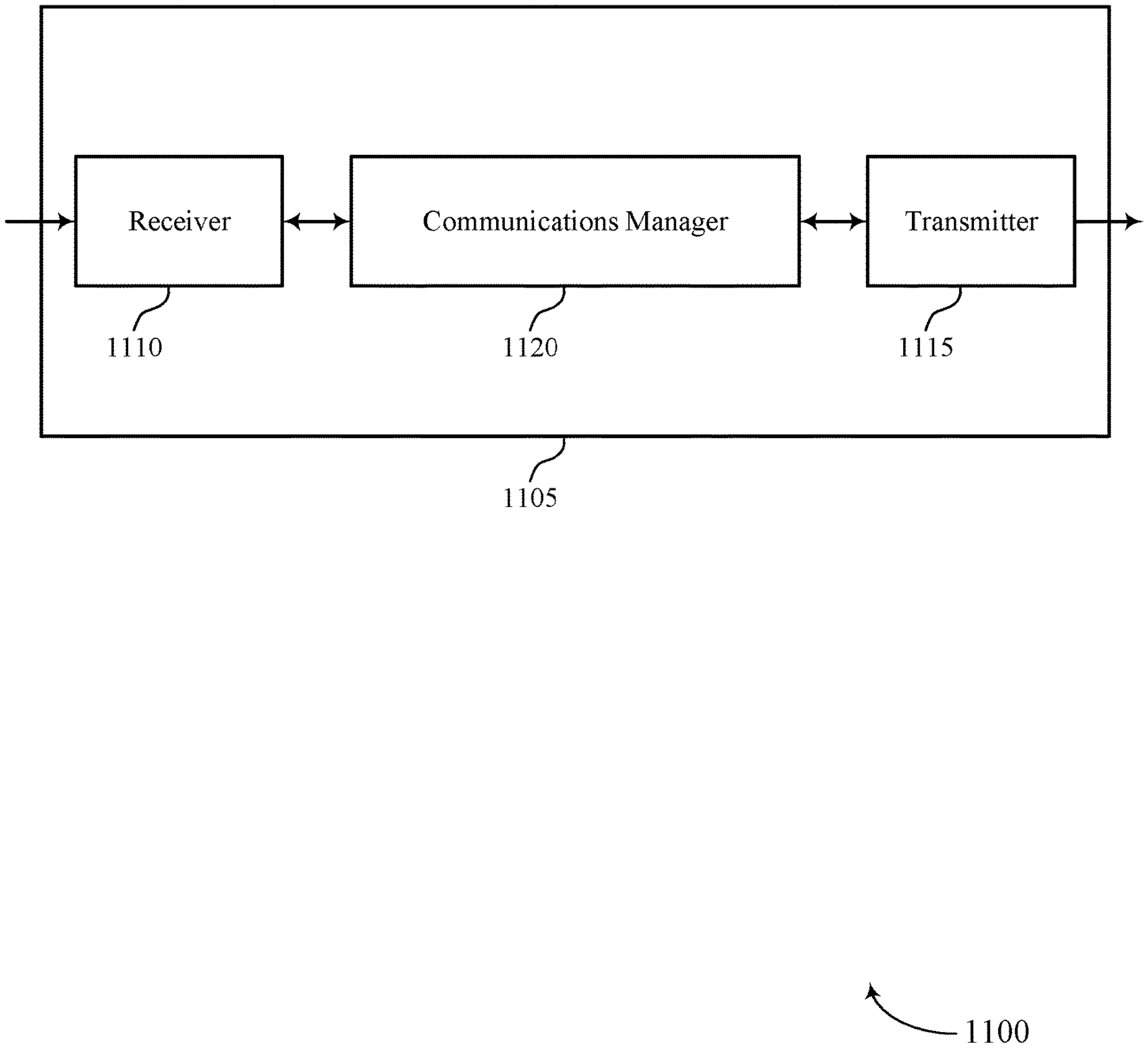
FIGS. 11 and 12 show block diagrams of devices that support managing untrusted UEs for data collection in accordance with one or more aspects of the present disclosure.

FIG. 11 shows a block diagram 1100 of a device 1105 that supports managing untrusted UEs for data collection in accordance with one or more aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to managing untrusted UEs for data collection). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to managing untrusted UEs for data collection). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of managing untrusted UEs for data collection as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. For example, the communications manager 1120 may be configured as or otherwise support a means for transmitting, based on a data collection process for a set of multiple UEs associated with a machine learning model, information corresponding to the UE, the information associated with the machine learning model. The communications manager 1120 may be configured as or otherwise support a means for receiving, based on the UE being considered untrusted (e.g., based on a consideration of the UE as untrusted) in accordance with a predicted output of the machine learning model, a control signal that configures the UE to refrain from the data collection process. The predicted output of the machine learning model may be based on the information corresponding to the UE.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for improving machine learning processes. For example, the device 1105 may improve the reliability and security of machine learning model training, effectively improving the resulting machine learning models. Such machine learning models may improve the processing overhead at the device 1105. Additionally, or alternatively, the device 1105 may improve a processing overhead and signaling overhead associated with data collection based on configuring untrusted UEs 115 to refrain from data collection procedures.

Figure 12:
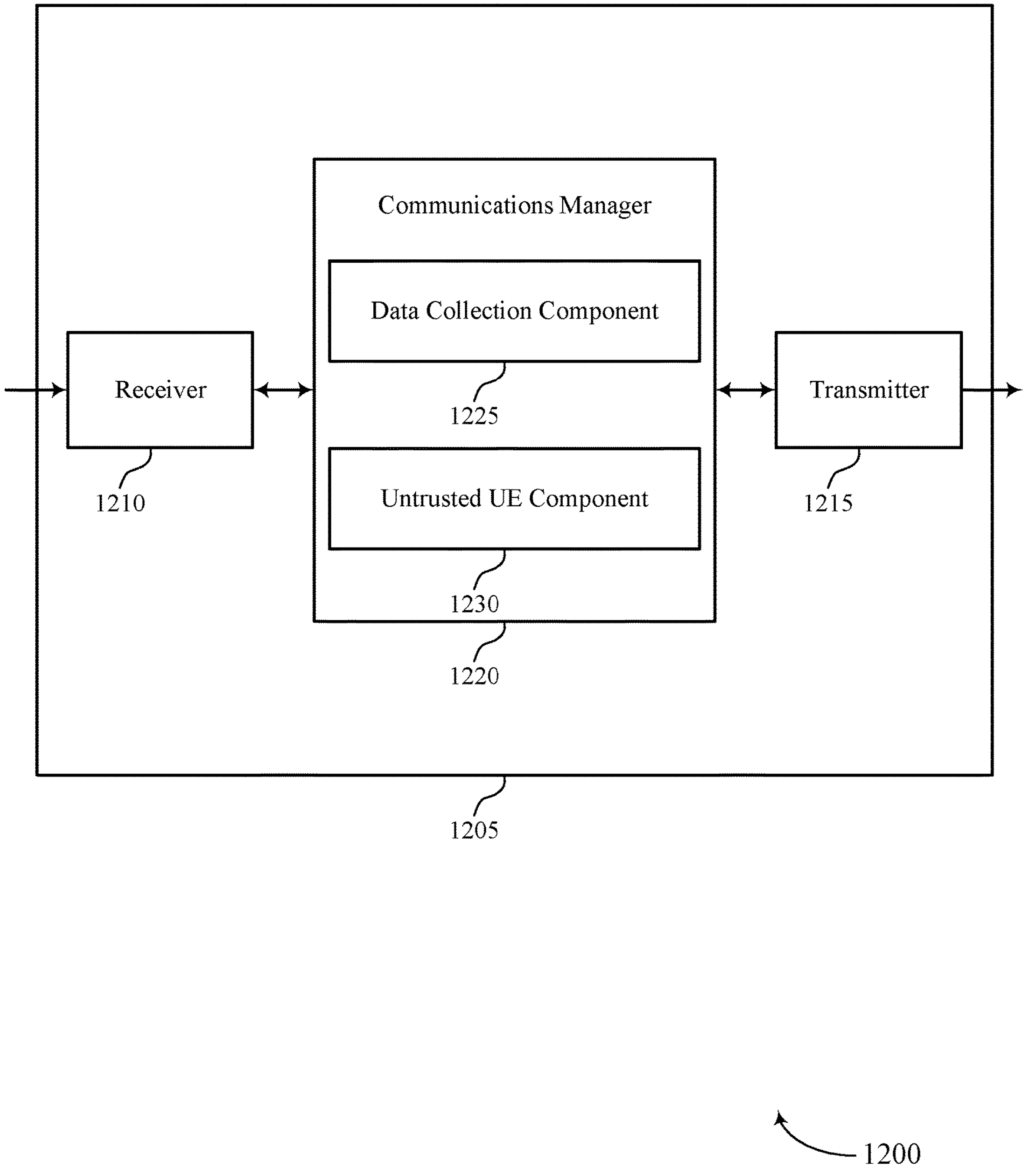

FIG. 12 shows a block diagram 1200 of a device 1205 that supports managing untrusted UEs for data collection in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to managing untrusted UEs for data collection). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to managing untrusted UEs for data collection). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of managing untrusted UEs for data collection as described herein. For example, the communications manager 1220 may include a data collection component 1225 an untrusted UE component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a UE in accordance with examples as disclosed herein. The data collection component 1225 may be configured as or otherwise support a means for transmitting, based on a data collection process for a set of multiple UEs associated with a machine learning model, information corresponding to the UE, the information associated with the machine learning model. The untrusted UE component 1230 may be configured as or otherwise support a means for receiving, based on the UE being considered untrusted (e.g., based on a consideration of the UE as untrusted) in accordance with a predicted output of the machine learning model, a control signal configuring the UE to refrain from the data collection process. The predicted output of the machine learning model may be based on the information corresponding to the UE.

Figure 13:
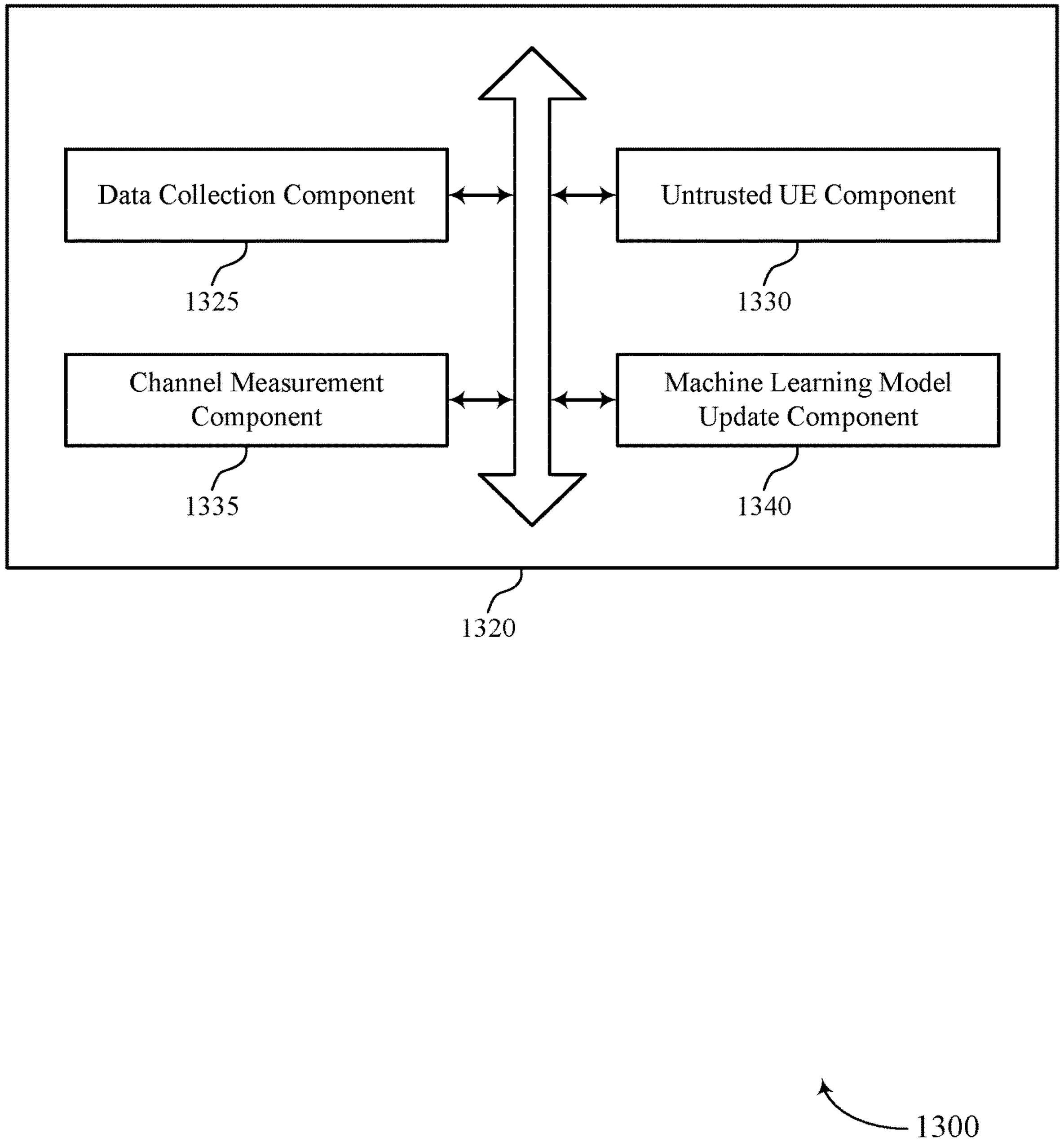
FIG. 13 shows a block diagram of a communications manager that supports managing untrusted UEs for data collection in accordance with one or more aspects of the present disclosure.

FIG. 13 shows a block diagram 1300 of a communications manager 1320 that supports managing untrusted UEs for data collection in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of managing untrusted UEs for data collection as described herein. For example, the communications manager 1320 may include a data collection component 1325, an untrusted UE component 1330, a channel measurement component 1335, a machine learning model update component 1340, or any combination thereof. Each of these components may communicate, directly or indirectly, with one another (e.g., via one or more buses).

The communications manager 1320 may support wireless communications at a UE in accordance with examples as disclosed herein. The data collection component 1325 may be configured as or otherwise support a means for transmitting, based on a data collection process for a set of multiple UEs associated with a machine learning model, information corresponding to the UE, the information associated with the machine learning model. The untrusted UE component 1330 may be configured as or otherwise support a means for receiving, based on the UE being considered untrusted in accordance with a predicted output of the machine learning model, a control signal configuring the UE to refrain from the data collection process. The predicted output of the machine learning model may be based on the information corresponding to the UE.

In some examples, the channel measurement component 1335 may be configured as or otherwise support a means for performing a channel measurement, where the information corresponding to the UE includes one or more measurement values based on the channel measurement.

In some examples, the machine learning model update component 1340 may be configured as or otherwise support a means for determining an update to the machine learning model, where the information corresponding to the UE includes the update to the machine learning model.

In some examples, the untrusted UE component 1330 may be configured as or otherwise support a means for refraining from transmitting additional information corresponding to the UE based on the control signal configuring the UE to refrain from the data collection process, the additional information associated with the machine learning model.

In some examples, a connection between the UE and a network entity is terminated based on the UE being considered untrusted.

Figure 14:
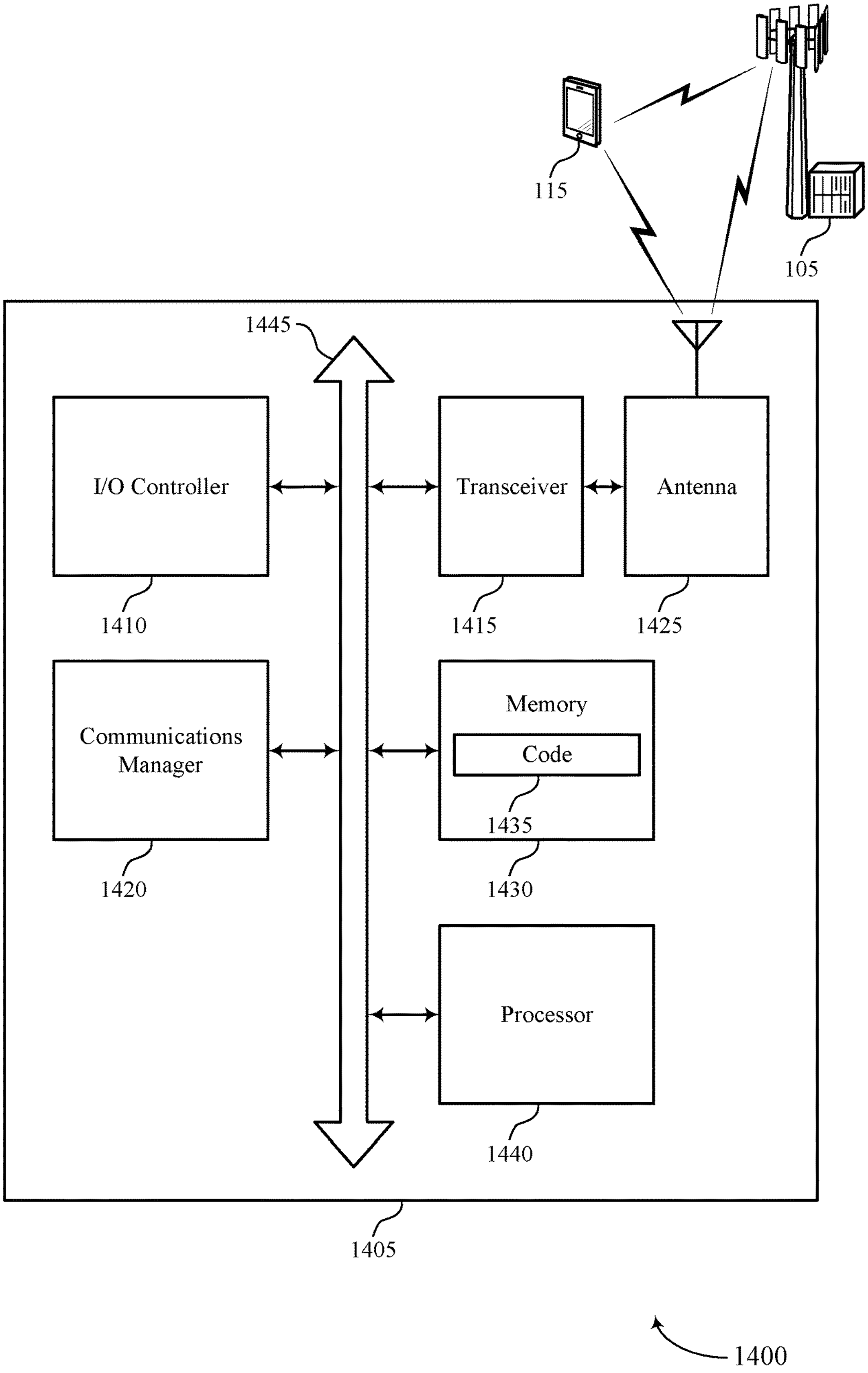
FIG. 14 shows a diagram of a system including a device that supports managing untrusted UEs for data collection in accordance with one or more aspects of the present disclosure.

FIG. 14 shows a diagram of a system 1400 including a device 1405 that supports managing untrusted UEs for data collection in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an I/O controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting managing untrusted UEs for data collection). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communications at a UE in accordance with examples as disclosed herein. For example, the communications manager 1420 may be configured as or otherwise support a means for transmitting, based on a data collection process for a set of multiple UEs associated with a machine learning model, information corresponding to the UE, the information associated with the machine learning model. The communications manager 1420 may be configured as or otherwise support a means for receiving, based on the UE being considered untrusted in accordance with a predicted output of the machine learning model, a control signal configuring the UE to refrain from the data collection process. The predicted output of the machine learning model may be based on the information corresponding to the UE.

By including or configuring the communications manager 1420 in accordance with examples as described herein, the device 1405 may support techniques for improving machine learning processes. For example, the device 1405 may improve the reliability and security of machine learning model training, effectively improving the resulting machine learning models. The device 1405 may additionally, or alternatively, protect against corrupt data skewing machine learning training and model outputs, improving any processes involving machine learning operations for a wireless communications system.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of managing untrusted UEs for data collection as described herein, or the processor 1440 and the memory 1430 may be otherwise configured to perform or support such operations.

Figure 15:
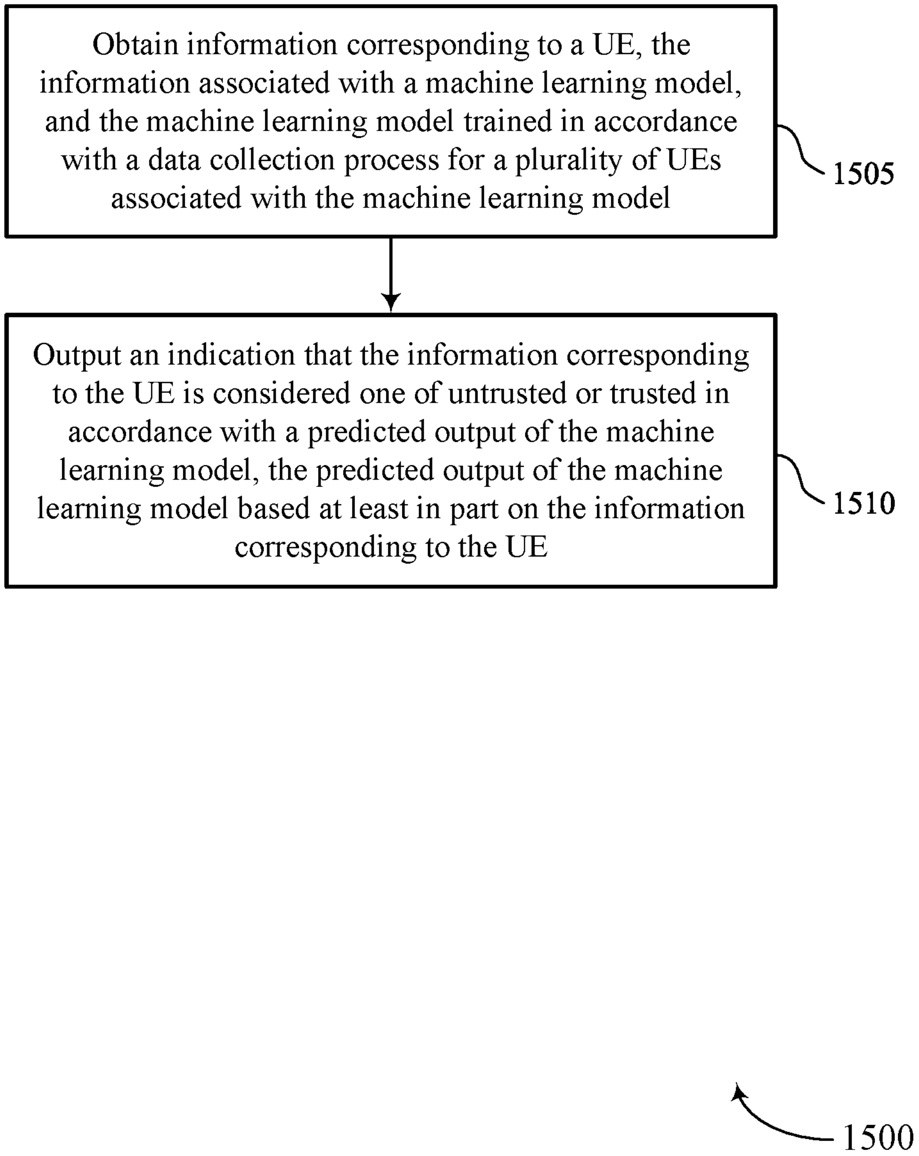
FIGS. 15 through 18 show flowcharts illustrating methods that support managing untrusted UEs for data collection in accordance with one or more aspects of the present disclosure.

FIG. 15 shows a flowchart illustrating a method 1500 that supports managing untrusted UEs for data collection in accordance with one or more aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include obtaining information corresponding to a UE, the information associated with a machine learning model, and the machine learning model trained in accordance with a data collection process for a set of multiple UEs associated with the machine learning model. The operations of 1505 may be performed in accordance with examples as disclosed herein. In some examples, aspects of the operations of 1505 may be performed by a data collection component 925 as described with reference to FIG. 9.

At 1510, the method may include outputting an indication that the information corresponding to the UE is considered one of untrusted or trusted in accordance with a predicted output of the machine learning model, the predicted output of the machine learning model based on the information corresponding to the UE. The operations of 1510 may be performed in accordance with examples as disclosed herein. In some examples, aspects of the operations of 1510 may be performed by a trust indication component 930 as described with reference to FIG. 9.

Figure 16:
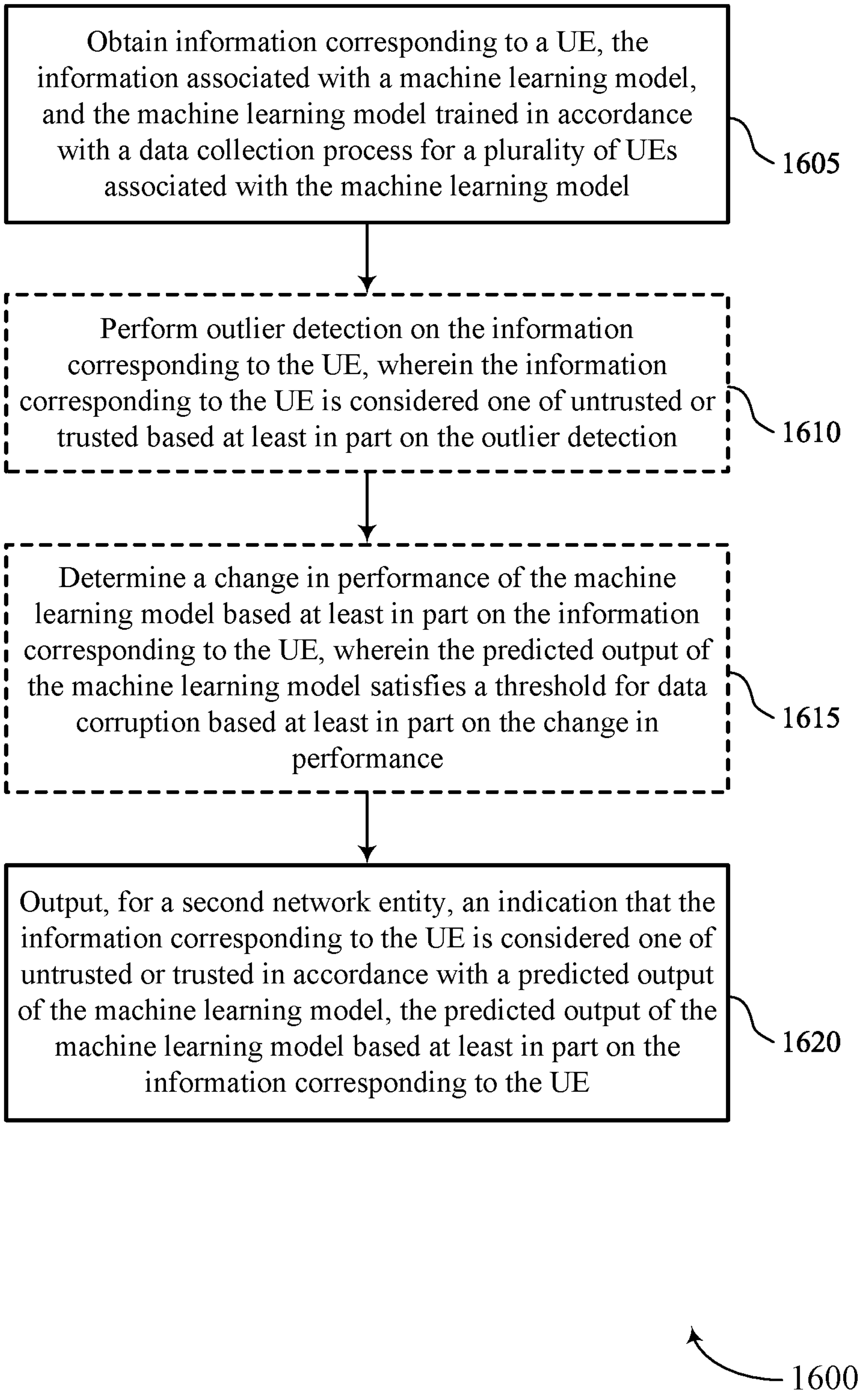

FIG. 16 shows a flowchart illustrating a method 1600 that supports managing untrusted UEs for data collection in accordance with one or more aspects of the present disclosure. The operations of the method 1600 may be implemented by a network entity or its components as described herein. For example, the operations of the method 1600 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1605, the method may include obtaining information corresponding to a UE, the information associated with a machine learning model, and the machine learning model trained in accordance with a data collection process for a set of multiple UEs associated with the machine learning model. The operations of 1605 may be performed in accordance with examples as disclosed herein. In some examples, aspects of the operations of 1605 may be performed by a data collection component 925 as described with reference to FIG. 9.

In some examples, at 1610, the method may include performing outlier detection on the information corresponding to the UE, where the information corresponding to the UE is considered one of untrusted or trusted based on the outlier detection. The operations of 1610 may be performed in accordance with examples as disclosed herein. In some examples, aspects of the operations of 1610 may be performed by an outlier detection component 945 as described with reference to FIG. 9.

Additionally, or alternatively, at 1615, the method may include determining a change in performance of the machine learning model based on the information corresponding to the UE, where the predicted output of the machine learning model satisfies a threshold for data corruption based on the change in performance. The operations of 1615 may be performed in accordance with examples as disclosed herein. In some examples, aspects of the operations of 1615 may be performed by a performance change component 950 as described with reference to FIG. 9.

At 1620, the method may include outputting (e.g., for a second network entity) an indication that the information corresponding to the UE is considered one of untrusted or trusted in accordance with a predicted output of the machine learning model, the predicted output of the machine learning model being based on the information corresponding to the UE. The operations of 1620 may be performed in accordance with examples as disclosed herein. In some examples, aspects of the operations of 1620 may be performed by a trust indication component 930 as described with reference to FIG. 9.

Figure 17:
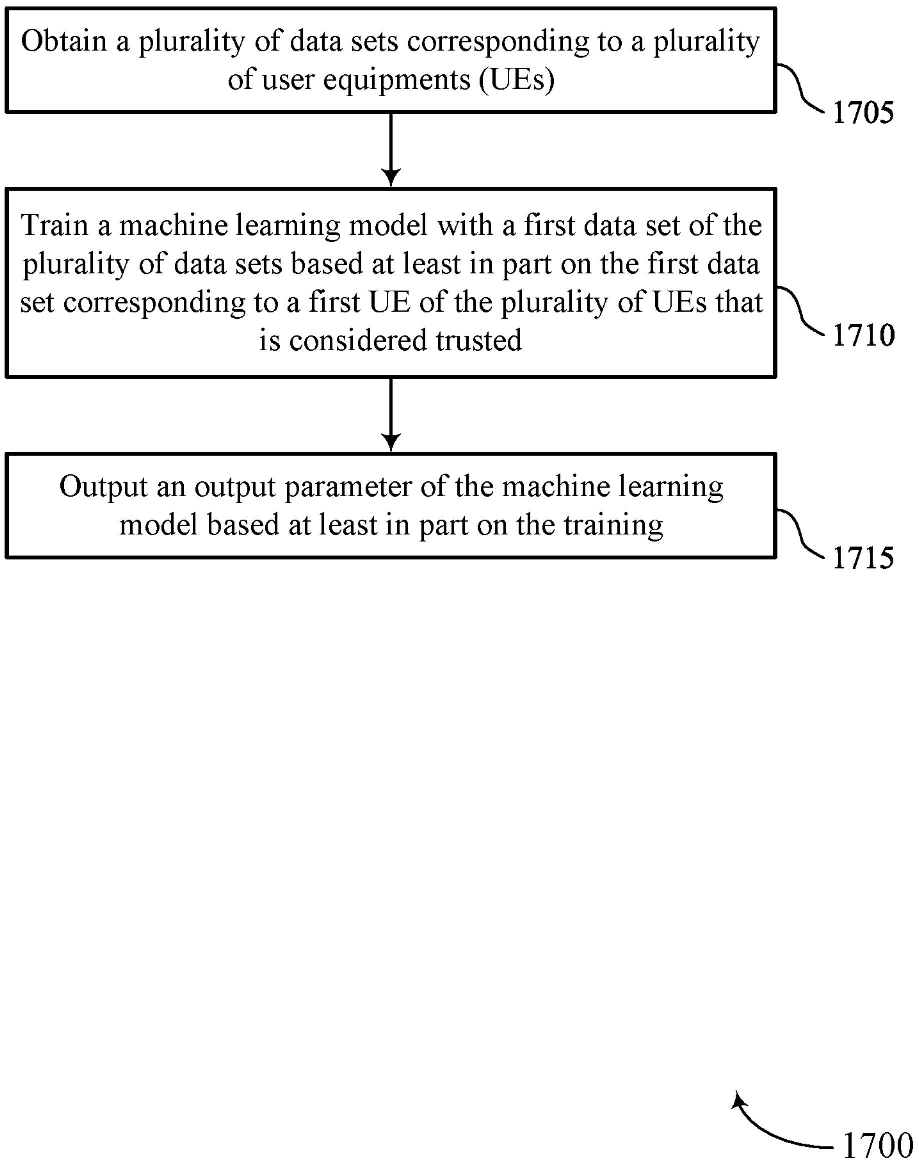

FIG. 17 shows a flowchart illustrating a method 1700 that supports managing untrusted UEs for data collection in accordance with one or more aspects of the present disclosure. The operations of the method 1700 may be implemented by a network entity or its components as described herein. For example, the operations of the method 1700 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1705, the method may include obtaining a set of multiple data sets corresponding to a set of multiple UEs. The operations of 1705 may be performed in accordance with examples as disclosed herein. In some examples, aspects of the operations of 1705 may be performed by a data collection component 925 as described with reference to FIG. 9.

At 1710, the method may include training a machine learning model with a first data set of the set of multiple data sets based on the first data set corresponding to a first UE of the set of multiple UEs that is considered trusted. The operations of 1710 may be performed in accordance with examples as disclosed herein. In some examples, aspects of the operations of 1710 may be performed by a machine learning training component 935 as described with reference to FIG. 9.

At 1715, the method may include outputting an output parameter of the machine learning model based on the training. The operations of 1715 may be performed in accordance with examples as disclosed herein. In some examples, aspects of the operations of 1715 may be performed by a machine learning output component 940 as described with reference to FIG. 9.

Figure 18:
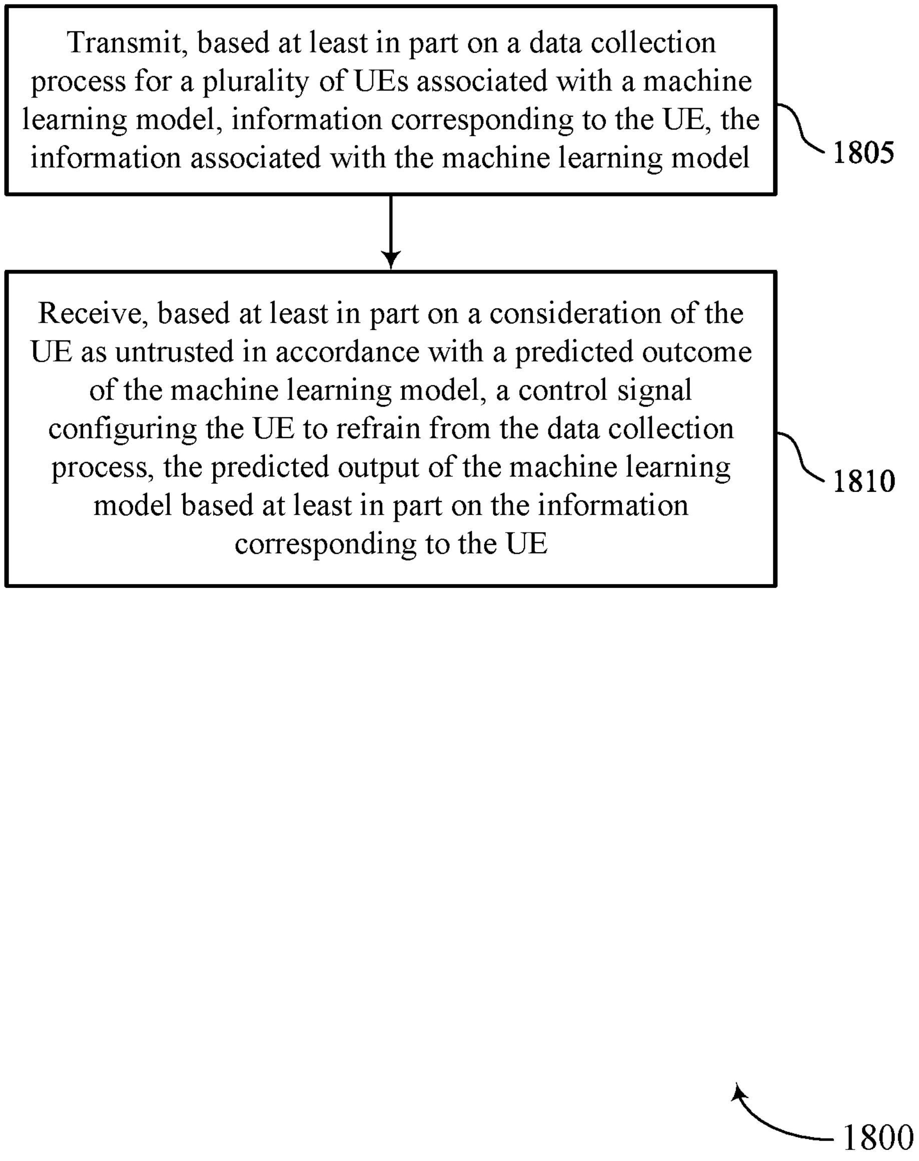

FIG. 18 shows a flowchart illustrating a method 1800 that supports managing untrusted UEs for data collection in accordance with one or more aspects of the present disclosure. The operations of the method 1800 may be implemented by a UE or its components as described herein. For example, the operations of the method 1800 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1805, the method may include transmitting, based on a data collection process for a set of multiple UEs associated with a machine learning model, information corresponding to the UE, the information associated with the machine learning model. The operations of 1805 may be performed in accordance with examples as disclosed herein. In some examples, aspects of the operations of 1805 may be performed by a data collection component 1325 as described with reference to FIG. 13.

At 1810, the method may include receiving, based on the UE being considered untrusted (e.g., a consideration of the UE as untrusted) in accordance with a predicted outcome of the machine learning model, a control signal configuring the UE to refrain from the data collection process. The predicted output of the machine learning model may be based on the information corresponding to the UE. The operations of 1810 may be performed in accordance with examples as disclosed herein. In some examples, aspects of the operations of 1810 may be performed by an untrusted UE component 1330 as described with reference to FIG. 13.

The following provides an overview of aspects of the present disclosure:

Aspect 1: An apparatus for wireless communications at a first network entity, comprising: a processor; and memory coupled with the processor, the processor configured to: obtain information corresponding to a UE, the information associated with a machine learning model, the machine learning model trained in accordance with a data collection process for a plurality of UEs associated with the machine learning model; and output an indication that the information corresponding to the UE is considered one of untrusted or trusted in accordance with a predicted output of the machine learning model, the predicted output of the machine learning model based at least in part on the information corresponding to the UE.

Aspect 2: The apparatus of aspect 1, wherein the processor is further configured to: perform outlier detection on the information corresponding to the UE, wherein the information corresponding to the UE is considered one of untrusted or trusted based at least in part on the outlier detection.

Aspect 3: The apparatus of any of aspects 1 through 2, wherein the processor is further configured to: determine a change in performance of the machine learning model based at least in part on the information corresponding to the UE, wherein the predicted output of the machine learning model satisfies a threshold for data corruption based at least in part on the change in performance.

Aspect 4: The apparatus of any of aspects 1 through 3, wherein the processor is further configured to: assign a trust score to the information corresponding to the UE in accordance with the predicted output of the machine learning model, wherein the indication that the information corresponding to the UE is considered one of untrusted or trusted comprises the trust score.

Aspect 5: The apparatus of aspect 4, wherein the trust score comprises a percentage value, or a quantized value, or both.

Aspect 6: The apparatus of any of aspects 4 through 5, wherein the trust score is associated with a time period for data collection from the UE.

Aspect 7: The apparatus of any of aspects 1 through 6, wherein the processor is further configured to: obtain additional information corresponding to the UE, the additional information associated with the machine learning model; and classify the additional information corresponding to the UE as untrusted based at least in part on the information corresponding to the UE being considered untrusted.

Aspect 8: The apparatus of any of aspects 1 through 7, wherein the processor configured to output the indication that the information corresponding to the UE is considered one of untrusted or trusted is configured to: output, for a database configured to store UE information for the data collection process, the indication that the information corresponding to the UE is considered one of untrusted or trusted.

Aspect 9: The apparatus of any of aspects 1 through 8, wherein the processor is further configured to: store a list of trusted UEs, or a list of untrusted UEs, or both based at least in part on the information corresponding to the UE being considered one of untrusted or trusted.

Aspect 10: The apparatus of any of aspects 1 through 9, wherein the processor is further configured to: predict whether the UE intentionally corrupted the information corresponding to the UE; and handle the information corresponding to the UE based at least in part on the prediction.

Aspect 11: The apparatus of any of aspects 1 through 10, wherein the processor is further configured to: obtain a request for the information corresponding to the UE, wherein the indication that the information corresponding to the UE is considered one of untrusted or trusted is output in response to the request.

Aspect 12: The apparatus of any of aspects 1 through 11, wherein the processor is further configured to: output a configuration for the UE to refrain from the data collection process associated with the machine learning model based at least in part on the information corresponding to the UE being considered untrusted.

Aspect 13: The apparatus of any of aspects 1 through 12, wherein the processor is further configured to: terminate a connection that corresponds to the UE based at least in part on the information corresponding to the UE being considered untrusted.

Aspect 14: The apparatus of any of aspects 1 through 12, wherein the processor is further configured to: restrict wireless service for the UE based at least in part on the information corresponding to the UE being considered untrusted.

Aspect 15: The apparatus of any of aspects 1 through 14, wherein the processor is further configured to: output a parameter associated with the machine learning model to one or more UEs, wherein the UE is excluded from the one or more UEs based at least in part on the information corresponding to the UE being considered untrusted.

Aspect 16: The apparatus of any of aspects 1 through 15, wherein the information corresponding to the UE comprises training data for the machine learning model, or one or more measurement values for the UE, or an update to the machine learning model, or a combination thereof.

Aspect 17: An apparatus for wireless communications, comprising: a processor; and memory coupled with the processor, the processor configured to: obtain a plurality of data sets corresponding to a plurality of UEs; train a machine learning model with a first data set of the plurality of data sets based at least in part on the first data set corresponding to a first UE of the plurality of UEs that is considered trusted; and output an output parameter of the machine learning model based at least in part on the trained machine learning model.

Aspect 18: The apparatus of aspect 17, wherein the processor is further configured to: refrain from training the machine learning model using a second data set of the plurality of data sets based at least in part on the second data set corresponding to a second UE of the plurality of UEs that is considered untrusted.

Aspect 19: The apparatus of any of aspects 17 through 18, the processor configured to obtain the plurality of data sets is configured to: obtain a plurality of indications that indicate whether the plurality of data sets, or the plurality of UEs, or both are considered one of untrusted or trusted, wherein the machine learning model is trained based at least in part on the plurality of indications.

Aspect 20: The apparatus of any of aspects 17 through 19, the processor configured to obtain the plurality of data sets is configured to: obtain a plurality of trust scores that correspond to the plurality of data sets, or the plurality of UEs, or both; and compare the plurality of trust scores to a threshold for data corruption, wherein the machine learning model is trained based at least in part on the comparison.

Aspect 21: The apparatus of any of aspects 17 through 20, wherein the processor is further configured to: output a request for the plurality of data sets, wherein the plurality of data sets is obtained in response to the request.

Aspect 22: The apparatus of any of aspects 17 through 21, wherein the plurality of data sets is obtained from a network entity, or a database, or both.

Aspect 23: An apparatus for wireless communications at a UE, comprising: a processor; and memory coupled with the processor, the processor configured to: transmit, based at least in part on a data collection process for a plurality of UEs associated with a machine learning model, information corresponding to the UE, the information associated with the machine learning model; and receive, based at least in part on a consideration of the UE as untrusted in accordance with a predicted output of the machine learning model, a control signal that configures the UE to refrain from the data collection process, the predicted output of the machine learning model based at least in part on the information corresponding to the UE.

Aspect 24: The apparatus of aspect 23, wherein the processor is further configured to: perform a channel measurement, wherein the information corresponding to the UE comprises one or more measurement values based at least in part on the channel measurement.

Aspect 25: The apparatus of aspect 23, wherein the processor is further configured to: determine an update to the machine learning model, wherein the information corresponding to the UE comprises the update to the machine learning model.

Aspect 26: The apparatus of any of aspects 23 through 25, wherein the processor is further configured to: refrain from transmission of additional information corresponding to the UE based at least in part on the control signal, the additional information associated with the machine learning model.

Aspect 27: The apparatus of any of aspects 23 through 26, wherein a connection between the UE and a network entity is terminated based at least in part on the consideration of the UE as untrusted.

Aspect 28: A method for wireless communications at a first network entity, comprising: obtaining information corresponding to a UE, the information associated with a machine learning model, the machine learning model trained in accordance with a data collection process for a plurality of UEs associated with the machine learning model; and outputting an indication that the information corresponding to the UE is considered one of untrusted or trusted in accordance with a predicted output of the machine learning model, the predicted output of the machine learning model based at least in part on the information corresponding to the UE.

Aspect 29: The method of aspect 28, further comprising: performing outlier detection on the information corresponding to the UE, wherein the information corresponding to the UE is considered one of untrusted or trusted based at least in part on the outlier detection.

Aspect 30: The method of any of aspects 28 through 29, further comprising: determining a change in performance of the machine learning model based at least in part on the information corresponding to the UE, wherein the predicted output of the machine learning model satisfies a threshold for data corruption based at least in part on the change in performance.

Aspect 31: The method of any of aspects 28 through 30, further comprising: assigning a trust score to the information corresponding to the UE in accordance with the predicted output of the machine learning model, wherein the indication that the information corresponding to the UE is considered one of untrusted or trusted comprises the trust score.

Aspect 32: The method of aspect 31, wherein the trust score comprises a percentage value, or a quantized value, or both.

Aspect 33: The method of any of aspects 31 through 32, wherein the trust score is associated with a time period for data collection from the UE.

Aspect 34: The method of any of aspects 28 through 33, further comprising: obtaining additional information corresponding to the UE, the additional information associated with the machine learning model; and classifying the additional information corresponding to the UE as untrusted based at least in part on the information corresponding to the UE being considered untrusted.

Aspect 35: The method of any of aspects 28 through 34, wherein outputting the indication that the information corresponding to the UE is considered one of untrusted or trusted comprises: outputting, for a database configured to store UE information for the data collection process, the indication that the information corresponding to the UE is considered one of untrusted or trusted.

Aspect 36: The method of any of aspects 28 through 35, further comprising: storing a list of trusted UEs, or a list of untrusted UEs, or both based at least in part on the information corresponding to the UE being considered one of untrusted or trusted.

Aspect 37: The method of any of aspects 28 through 36, further comprising: predicting whether the UE intentionally corrupted the information corresponding to the UE; and handling the information corresponding to the UE based at least in part on the prediction.

Aspect 38: The method of any of aspects 28 through 37, further comprising: obtaining a request for the information corresponding to the UE, wherein the indication that the information corresponding to the UE is considered one of untrusted or trusted is output in response to the request.

Aspect 39: The method of any of aspects 28 through 38, further comprising: outputting a configuration for the UE to refrain from the data collection process associated with the machine learning model based at least in part on the information corresponding to the UE being considered untrusted.

Aspect 40: The method of any of aspects 28 through 39, further comprising: terminating a connection that corresponds to the UE based at least in part on the information corresponding to the UE being considered untrusted.

Aspect 41: The method of any of aspects 28 through 39, further comprising: restricting wireless service for the UE based at least in part on the information corresponding to the UE being considered untrusted.

Aspect 42: The method of any of aspects 28 through 41, further comprising: outputting a parameter associated with the machine learning model to one or more UEs, wherein the UE is excluded from the one or more UEs based at least in part on the information corresponding to the UE being considered untrusted.

Aspect 43: The method of any of aspects 28 through 42, wherein the information corresponding to the UE comprises training data for the machine learning model, or one or more measurement values for the UE, or an update to the machine learning model, or a combination thereof.

Aspect 44: A method for wireless communications, comprising: obtaining a plurality of data sets corresponding to a plurality of UEs; training a machine learning model with a first data set of the plurality of data sets based at least in part on the first data set corresponding to a first UE of the plurality of UEs that is considered trusted; and outputting an output parameter of the machine learning model based at least in part on the trained machine learning model.

Aspect 45: The method of aspect 44, further comprising: refraining from training the machine learning model using a second data set of the plurality of data sets based at least in part on the second data set corresponding to a second UE of the plurality of UEs that is considered untrusted.

Aspect 46: The method of any of aspects 44 through 45, wherein obtaining the plurality of data sets comprises: obtaining a plurality of indications that indicate whether the plurality of data sets, or the plurality of UEs, or both are considered one of untrusted or trusted, wherein the machine learning model is trained based at least in part on the plurality of indications.

Aspect 47: The method of any of aspects 44 through 46, wherein obtaining the plurality of data sets comprises: obtaining a plurality of trust scores that correspond to the plurality of data sets, or the plurality of UEs, or both; and comparing the plurality of trust scores to a threshold for data corruption, wherein the machine learning model is trained based at least in part on the comparison.

Aspect 48: The method of any of aspects 44 through 47, further comprising: outputting a request for the plurality of data sets, wherein the plurality of data sets is obtained in response to the request.

Aspect 49: The method of any of aspects 44 through 48, wherein the plurality of data sets is obtained from a network entity, or a database, or both.

Aspect 50: A method for wireless communications at a UE, comprising: transmitting, based at least in part on a data collection process for a plurality of UEs associated with a machine learning model, information corresponding to the UE, the information associated with the machine learning model; and receiving, based at least in part on a consideration of the UE as untrusted in accordance with a predicted output of the machine learning model, a control signal that configures the UE to refrain from the data collection process, the predicted output of the machine learning model based at least in part on the information corresponding to the UE.

Aspect 51: The method of aspect 50, further comprising: performing a channel measurement, wherein the information corresponding to the UE comprises one or more measurement values based at least in part on the channel measurement.

Aspect 52: The method of aspect 50, further comprising: determining an update to the machine learning model, wherein the information corresponding to the UE comprises the update to the machine learning model.

Aspect 53: The method of any of aspects 50 through 52, further comprising: refraining from transmission of additional information corresponding to the UE based at least in part on the control signal, the additional information associated with the machine learning model.

Aspect 54: The method of any of aspects 50 through 53, wherein a connection between the UE and a network entity is terminated based at least in part on the consideration of the UE as untrusted.

Aspect 56: An apparatus for wireless communications at a first network entity, comprising at least one means for performing a method of any of aspects 28 through 43.

Aspect 57: A non-transitory computer-readable medium storing code for wireless communications at a first network entity, the code comprising instructions executable by a processor to perform a method of any of aspects 28 through 43.

Aspect 59: An apparatus for wireless communications, comprising at least one means for performing a method of any of aspects 44 through 49.

Aspect 60: A non-transitory computer-readable medium storing code for wireless communications, the code comprising instructions executable by a processor to perform a method of any of aspects 44 through 49.

Aspect 62: An apparatus for wireless communications at a UE, comprising at least one means for performing a method of any of aspects 50 through 54.

Aspect 63: A non-transitory computer-readable medium storing code for wireless communications at a UE, the code comprising instructions executable by a processor to perform a method of any of aspects 50 through 54.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity, comprising:

at least one processor; and at least one memory coupled with the at least one processor, the at least one processor configured to cause the first network entity to:

obtain information corresponding to a user equipment (UE), the information associated with training data for a machine learning model, the machine learning model trained in accordance with a data collection process for a plurality of UEs associated with the machine learning model;

determine a change in performance for the machine learning model based at least in part on a training procedure for the machine learning model that uses the information corresponding to the UE as the training data, wherein a predicted output of the machine learning model satisfies a threshold for data corruption based at least in part on the change in performance;

output an indication that the information corresponding to the UE is considered untrusted in accordance with the predicted output of the machine learning model satisfying the threshold; and terminate a connection that corresponds to the UE or restrict wireless service for the UE based at least in part on the information corresponding to the UE being considered untrusted in accordance with the predicted output of the machine learning model.

2. The first network entity of claim 1, wherein the at least one processor is further configured to cause the first network entity to:

perform outlier detection on the information corresponding to the UE, wherein the information corresponding to the UE is considered untrusted based at least in part on the outlier detection.

3. The first network entity of claim 1, wherein the at least one processor is further configured to cause the first network entity to:

assign a trust score to the information corresponding to the UE in accordance with the predicted output of the machine learning model, wherein the indication that the information corresponding to the UE is considered untrusted comprises the trust score.

4. The first network entity of claim 3, wherein the trust score comprises a percentage value, or a quantized value, or both.

5. The first network entity of claim 3, wherein the trust score is associated with a time period for data collection from the UE.

6. The first network entity of claim 1, wherein the at least one processor is further configured to cause the first network entity to:

obtain additional information corresponding to the UE, the additional information associated with the machine learning model; and classify the additional information corresponding to the UE as untrusted based at least in part on the information corresponding to the UE being considered untrusted.

7. The first network entity of claim 1, the at least one processor configured to output the indication that the information corresponding to the UE is considered untrusted is configured to cause the first network entity to:

output, for a database configured to store UE information for the data collection process, the indication that the information corresponding to the UE is considered untrusted.

8. The first network entity of claim 1, wherein the at least one processor is further configured to cause the first network entity to:

store a list of trusted UEs, or a list of untrusted UEs, or both based at least in part on the information corresponding to the UE being considered untrusted and additional information corresponding to an additional UE being considered trusted.

9. The first network entity of claim 1, wherein the at least one processor is further configured to cause the first network entity to:

predict whether the UE intentionally corrupted the information corresponding to the UE; and handle the information corresponding to the UE based at least in part on the prediction.

10. The first network entity of claim 1, wherein the at least one processor is further configured to cause the first network entity to:

obtain a request for the information corresponding to the UE, wherein the indication that the information corresponding to the UE is considered untrusted is output in response to the request.

11. The first network entity of claim 1, wherein the at least one processor is further configured to cause the first network entity to:

output a configuration for the UE to refrain from the data collection process associated with the machine learning model based at least in part on the information corresponding to the UE being considered untrusted.

12. The first network entity of claim 1, wherein the at least one processor is further configured to cause the first network entity to:

output a parameter associated with the machine learning model to one or more UEs, wherein the UE is excluded from the one or more UEs based at least in part on the information corresponding to the UE being considered untrusted.

13. The first network entity of claim 1, wherein the information corresponding to the UE further comprises one or more measurement values for the UE, or an update to the machine learning model, or a combination thereof.

14. A method for wireless communications at a first network entity, comprising:

obtaining information corresponding to a user equipment (UE), the information associated with training data for a machine learning model, the machine learning model trained in accordance with a data collection process for a plurality of UEs associated with the machine learning model;

determining a change in performance for the machine learning model based at least in part on a training procedure for the machine learning model that uses the information corresponding to the UE as the training data, wherein a predicted output of the machine learning model satisfies a threshold for data corruption based at least in part on the change in performance;

outputting an indication that the information corresponding to the UE is considered untrusted in accordance with the predicted output of the machine learning model satisfying the threshold; and terminating a connection that corresponds to the UE or restricting wireless service for the UE based at least in part on the information corresponding to the UE being considered untrusted in accordance with the predicted output of the machine learning model.

15. The method of claim 14, further comprising:

performing outlier detection on the information corresponding to the UE, wherein the information corresponding to the UE is considered untrusted based at least in part on the outlier detection.

16. The method of claim 14, further comprising:

assigning a trust score to the information corresponding to the UE in accordance with the predicted output of the machine learning model, wherein the indication that the information corresponding to the UE is considered untrusted comprises the trust score.

17. The method of claim 16, wherein the trust score comprises a percentage value, or a quantized value, or both.

18. The method of claim 16, wherein the trust score is associated with a time period for data collection from the UE.

19. The method of claim 14, further comprising:

obtaining additional information corresponding to the UE, the additional information associated with the machine learning model; and classifying the additional information corresponding to the UE as untrusted based at least in part on the information corresponding to the UE being considered untrusted.

20. The method of claim 14, wherein outputting the indication that the information corresponding to the UE is considered one of untrusted or trusted comprises:

outputting, for a database configured to store UE information for the data collection process, the indication that the information corresponding to the UE is considered untrusted.

21. The method of claim 14, further comprising:

storing a list of trusted UEs, or a list of untrusted UEs, or both based at least in part on the information corresponding to the UE being considered untrusted and additional information corresponding to an additional UE being considered trusted.

22. The method of claim 14, further comprising:

predicting whether the UE intentionally corrupted the information corresponding to the UE; and handling the information corresponding to the UE based at least in part on the prediction.

23. The method of claim 14, further comprising:

obtaining a request for the information corresponding to the UE, wherein the indication that the information corresponding to the UE is considered untrusted is output in response to the request.

24. The method of claim 14, further comprising:

outputting a configuration for the UE to refrain from the data collection process associated with the machine learning model based at least in part on the information corresponding to the UE being considered untrusted.

25. A first network entity for wireless communications, comprising:

means for obtaining information corresponding to a user equipment (UE), the information associated with training data for a machine learning model, the machine learning model trained in accordance with a data collection process for a plurality of UEs associated with the machine learning model;

means for determining a change in performance for the machine learning model based at least in part on a training procedure for the machine learning model that uses the information corresponding to the UE as the training data, wherein a predicted output of the machine learning model satisfies a threshold for data corruption based at least in part on the change in performance;

means for outputting an indication that the information corresponding to the UE is considered untrusted in accordance with the predicted output of the machine learning model satisfying the threshold; and means for terminating a connection that corresponds to the UE or restricting wireless service for the UE based at least in part on the information corresponding to the UE being considered untrusted in accordance with the predicted output of the machine learning model.

26. A non-transitory computer-readable medium storing code for wireless communications, the code comprising instructions executable by one or more processors to:

obtain information corresponding to a user equipment (UE), the information associated with training data for a machine learning model, the machine learning model trained in accordance with a data collection process for a plurality of UEs associated with the machine learning model;

determine a change in performance for the machine learning model based at least in part on a training procedure for the machine learning model that uses the information corresponding to the UE as the training data, wherein a predicted output of the machine learning model satisfies a threshold for data corruption based at least in part on the change in performance;

output an indication that the information corresponding to the UE is considered untrusted in accordance with the predicted output of the machine learning model satisfying the threshold; and terminate a connection that corresponds to the UE or restrict wireless service for the UE based at least in part on the information corresponding to the UE being considered untrusted in accordance with the predicted output of the machine learning model.

27. The method of claim 14, further comprising:

outputting a parameter associated with the machine learning model to one or more UEs, wherein the UE is excluded from the one or more UEs based at least in part on the information corresponding to the UE being considered untrusted.

28. The method of claim 14, wherein the information corresponding to the UE further comprises one or more measurement values for the UE, or an update to the machine learning model, or a combination thereof.

* * * * *